(12) United States Patent
Hamano

(10) Patent No.: US 6,392,816 B1
(45) Date of Patent: May 21, 2002

(54) VARIABLE MAGNIFICATION OPTICAL SYSTEM AND OPTICAL APPARATUS HAVING THE SAME

(75) Inventor: Hiroyuki Hamano, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/694,251

(22) Filed: Oct. 24, 2000

(30) Foreign Application Priority Data

Oct. 29, 1999 (JP) .......................................... 11-308790
Jun. 15, 2000 (JP) ...................................... 2000-180008

(51) Int. Cl.⁷ ........................... G02B 15/14; G02B 27/64
(52) U.S. Cl. ......................... 359/683; 359/554; 359/557
(58) Field of Search ................................. 359/676, 683, 359/554, 557

(56) References Cited

U.S. PATENT DOCUMENTS

| | | | |
|---|---|---|---|
| 4,832,471 A | 5/1989 | Hamano | 350/427 |
| 4,927,250 A | 5/1990 | Suda | 350/500 |
| 4,934,796 A | 6/1990 | Sugiura et al. | 350/427 |
| 4,988,174 A | 1/1991 | Horiuchi et al. | 350/427 |
| 4,998,809 A | 3/1991 | Tsuji et al. | 350/500 |
| 5,009,492 A | 4/1991 | Hamano | 350/427 |
| 5,039,211 A | 8/1991 | Maruyama | 359/557 |
| 5,050,972 A | 9/1991 | Mukaiya et al. | 359/683 |
| 5,134,524 A | 7/1992 | Hamano et al. | 359/687 |
| 5,138,492 A | 8/1992 | Hamano et al. | 359/684 |
| 5,270,857 A | 12/1993 | Oizumi et al. | 359/554 |
| 5,299,064 A | 3/1994 | Hamano et al. | 359/684 |
| 5,430,576 A | 7/1995 | Hamano | 359/684 |
| 5,502,594 A * | 3/1996 | Suzuki et al. | 359/557 |
| 5,521,758 A | 5/1996 | Hamano | 359/557 |
| 5,546,230 A | 8/1996 | Sato et al. | 359/684 |
| 5,585,966 A | 12/1996 | Suzuki | 359/557 |
| 5,600,490 A | 2/1997 | Sugawara et al. | 359/690 |
| 5,638,216 A | 6/1997 | Horiuchi et al. | 359/683 |
| 5,677,792 A | 10/1997 | Hamano | 359/557 |
| 5,751,496 A | 5/1998 | Hamano | 359/677 |
| 5,771,123 A | 6/1998 | Hamano | 359/557 |
| 5,774,275 A | 6/1998 | Hamano | 359/687 |
| 5,818,646 A | 10/1998 | Hamano | 359/684 |
| 5,847,882 A | 12/1998 | Nakayama | 359/684 |
| 5,905,530 A | 5/1999 | Yokota et al. | 348/240 |
| 5,933,283 A | 8/1999 | Hamano | 359/687 |
| 5,963,378 A | 10/1999 | Tochigi et al. | 359/687 |
| 6,094,312 A | 7/2000 | Makayama | 359/676 |

FOREIGN PATENT DOCUMENTS

| | | |
|---|---|---|
| JP | 56-21133 | 2/1981 |
| JP | 61-223819 | 10/1986 |
| JP | 1-116619 | 5/1989 |
| JP | 2-124521 | 5/1990 |
| JP | 7-128619 | 5/1995 |
| JP | 7-199124 | 8/1995 |
| JP | 8-5913 | 1/1996 |
| JP | 10-197786 | 7/1998 |

* cited by examiner

Primary Examiner—Scott J. Sugarman
(74) Attorney, Agent, or Firm—Fitzpatrick, Cella, Harper & Scinto

(57) ABSTRACT

A variable magnification optical system includes, in order from an object side to an image side, a first lens unit of positive refractive power, a second lens unit of negative refractive power, a third lens unit of positive refractive power, a fourth lens unit of negative refractive power and a fifth lens unit of positive refractive power. In the variable magnification optical system, at least the second lens unit and the fourth lens unit are moved along an optical axis during variation of magnification, and the third lens unit is moved in such a way as to have a component having directions perpendicular to the optical axis to displace an image formed by the variable magnification optical system.

19 Claims, 17 Drawing Sheets

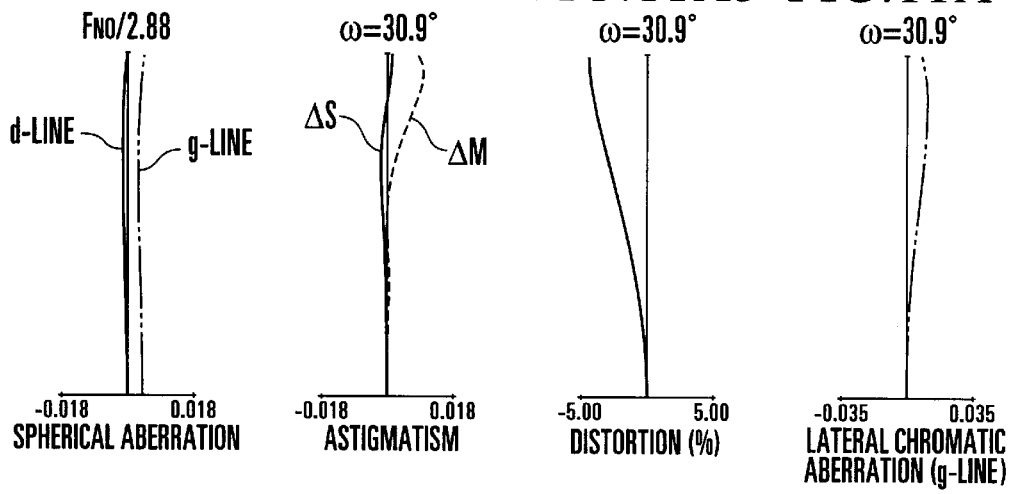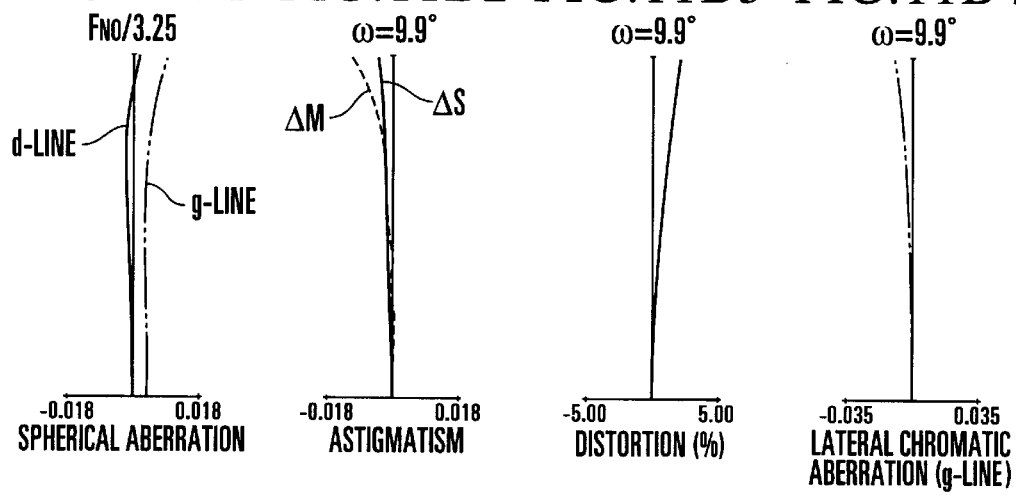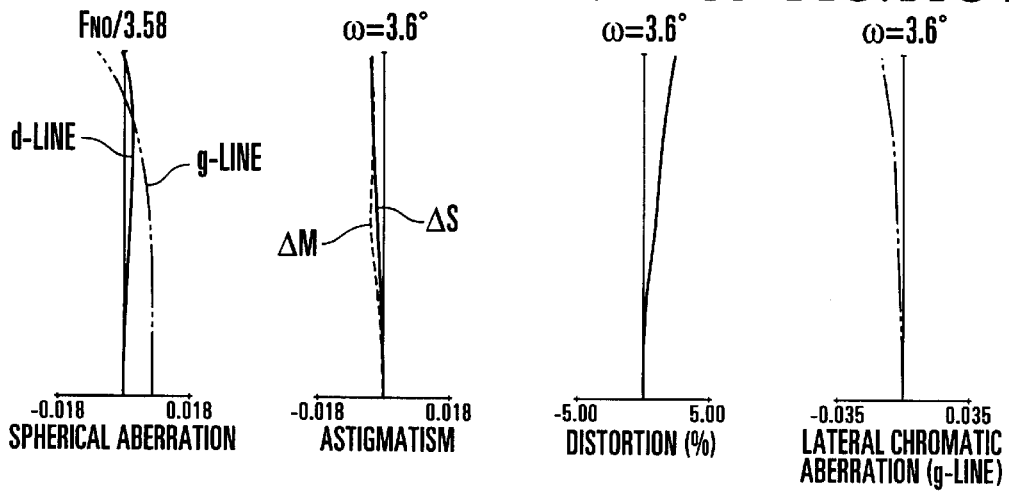

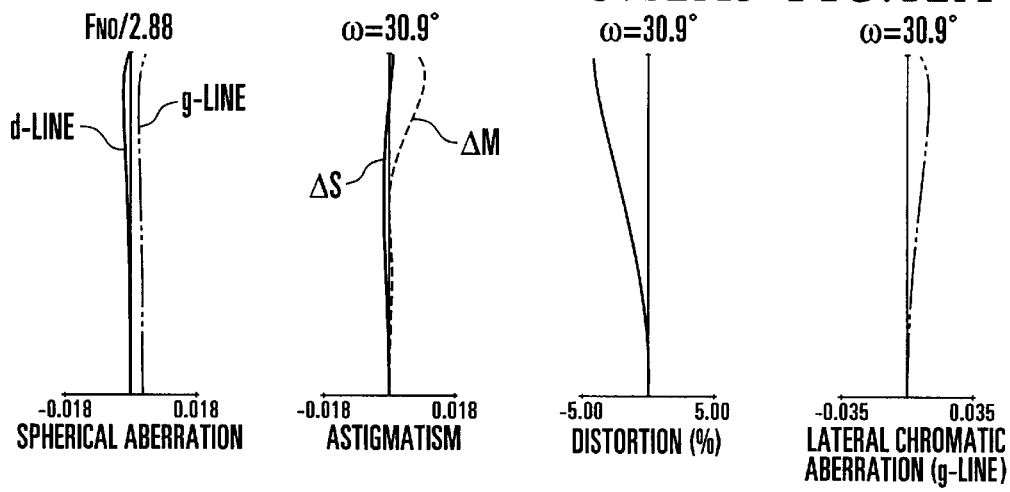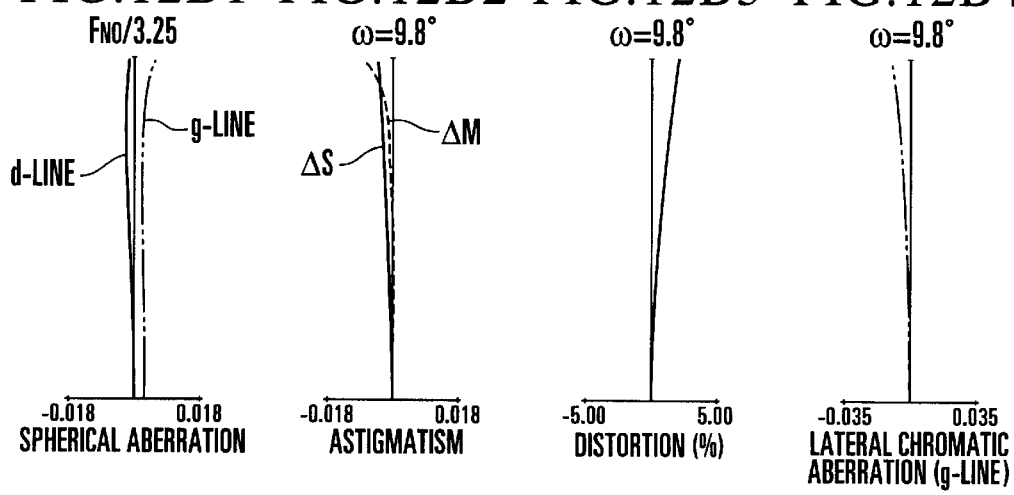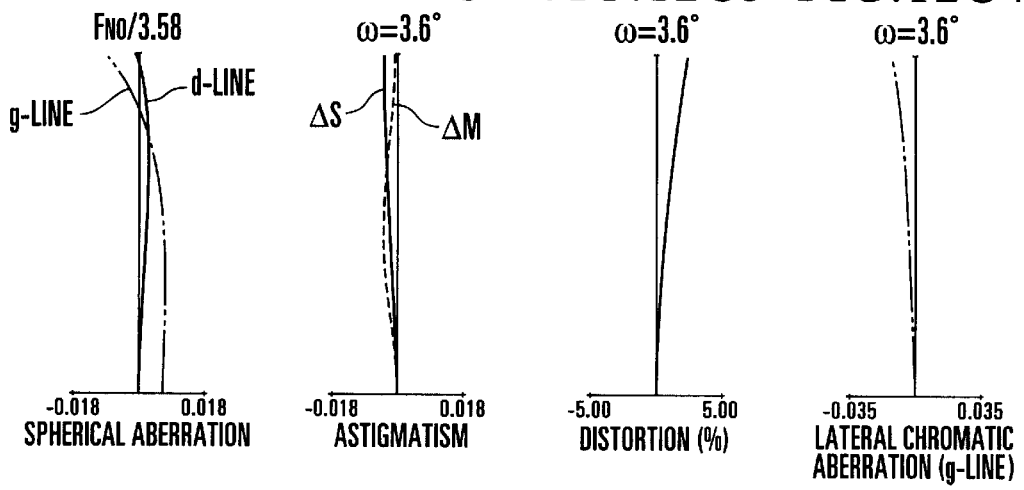

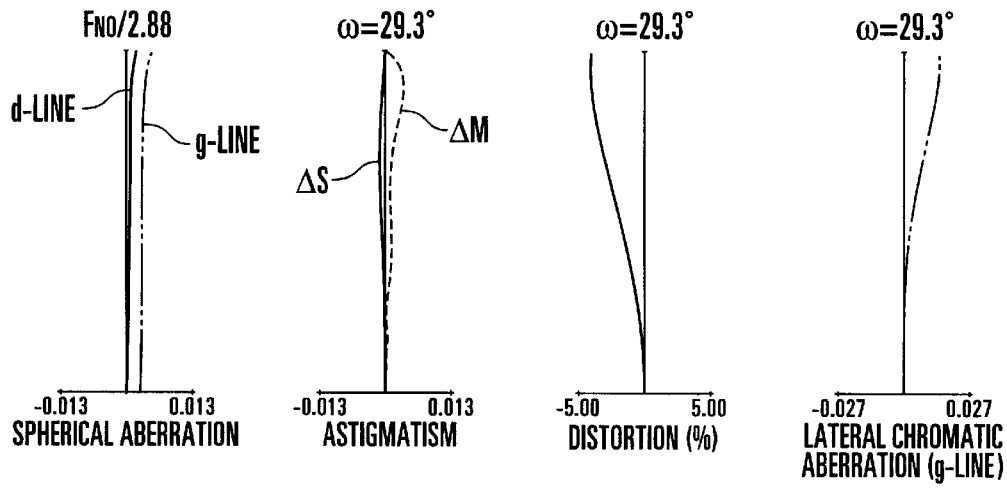
FIG.13A1 FIG.13A2 FIG.13A3 FIG.13A4
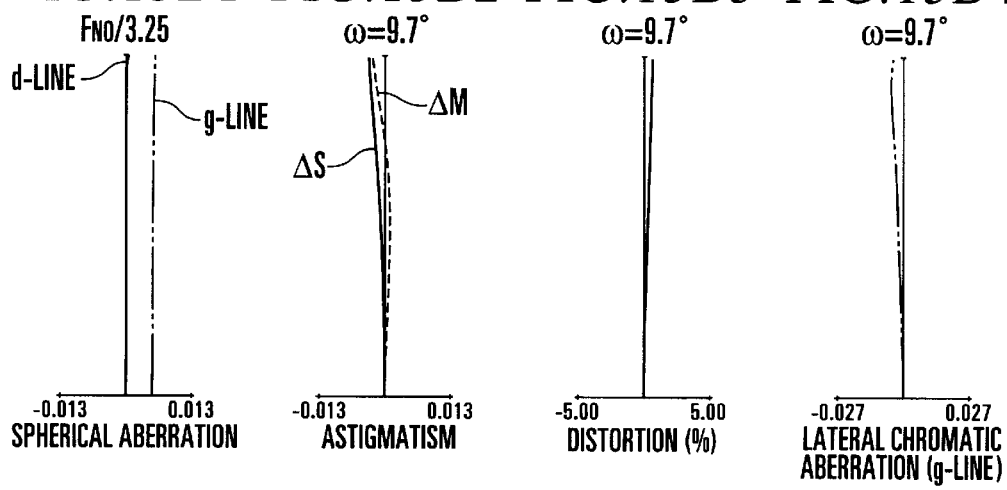
FIG.13B1 FIG.13B2 FIG.13B3 FIG.13B4
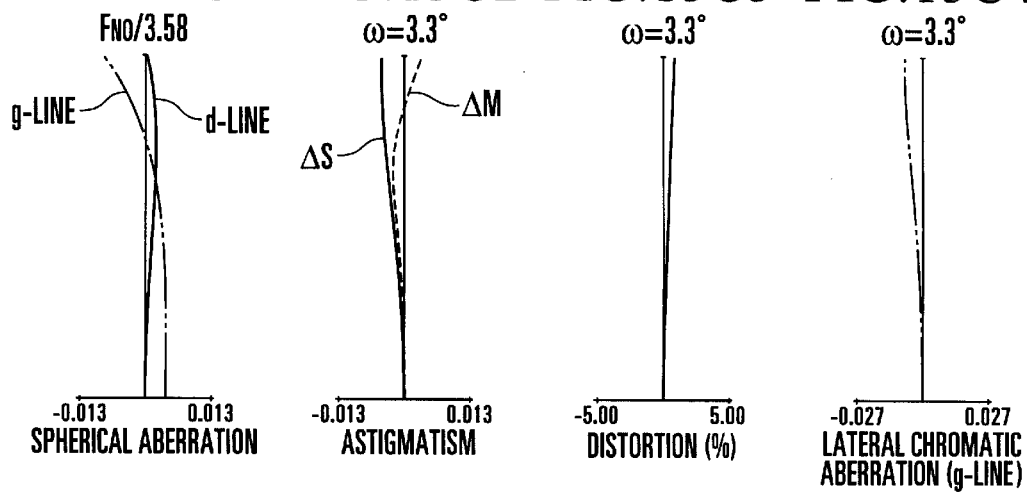
FIG.13C1 FIG.13C2 FIG.13C3 FIG.13C4

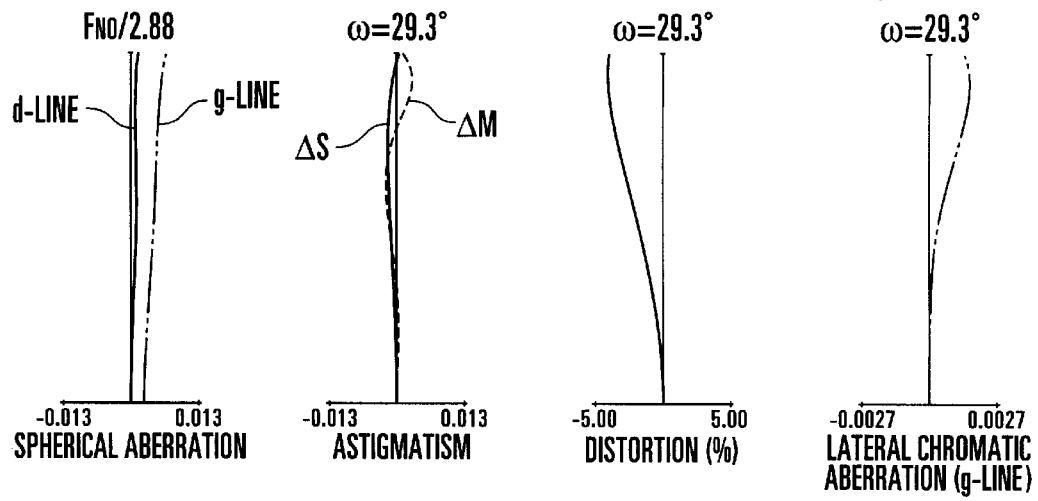
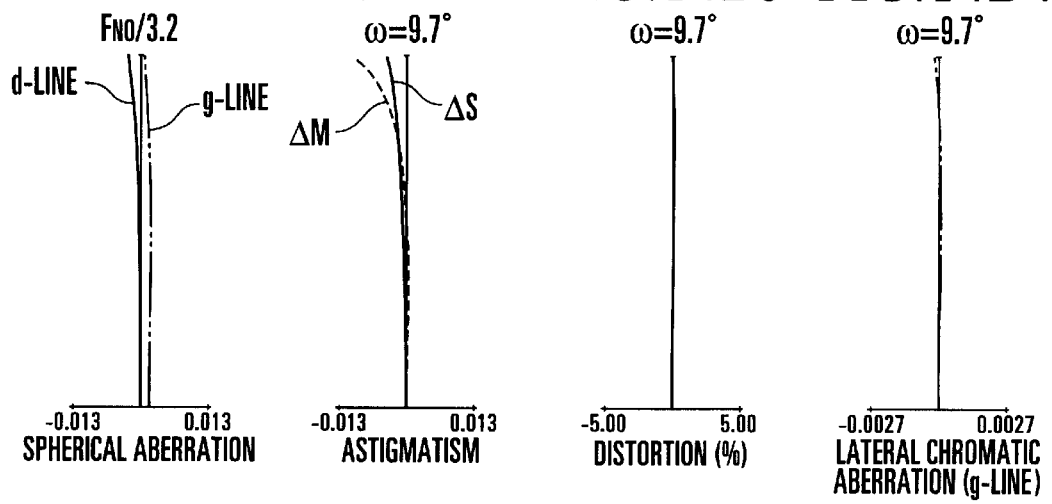
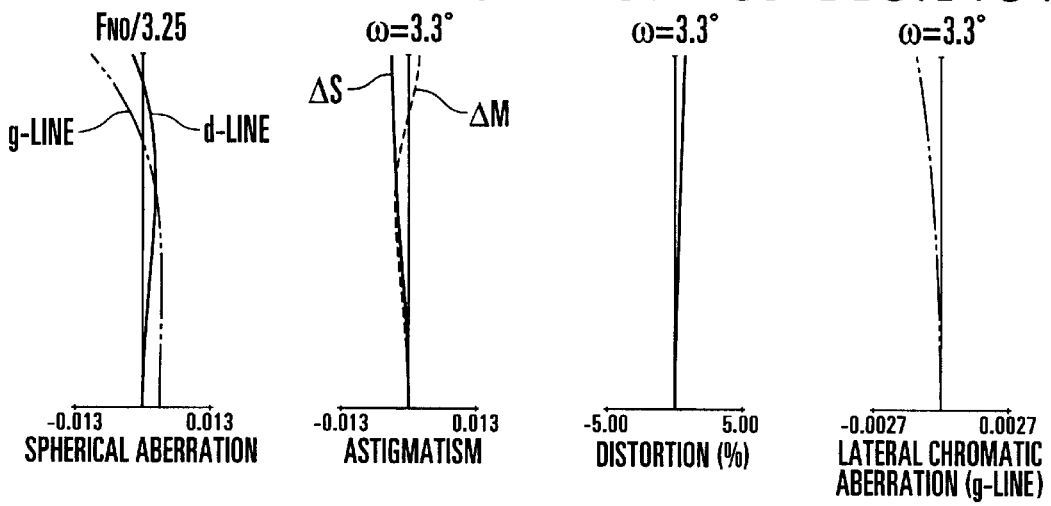

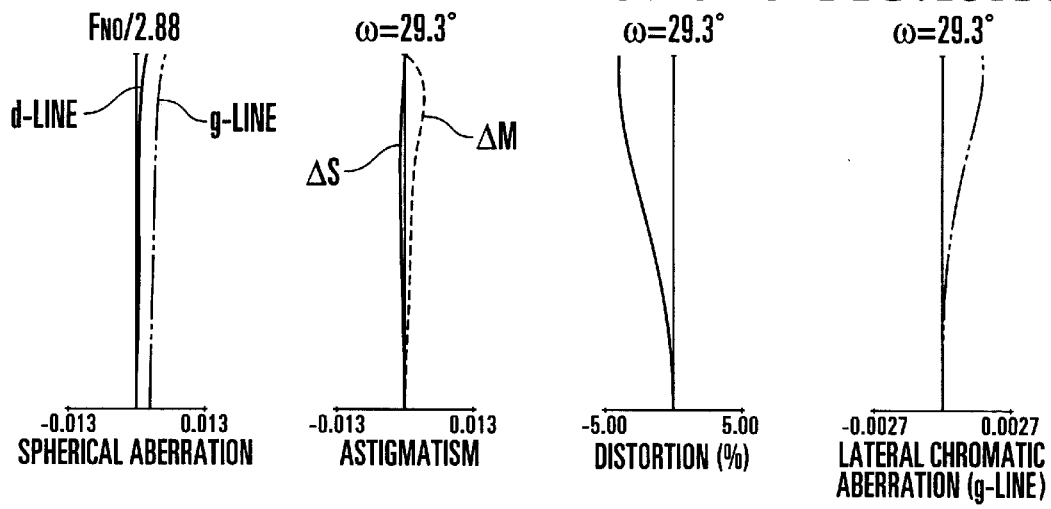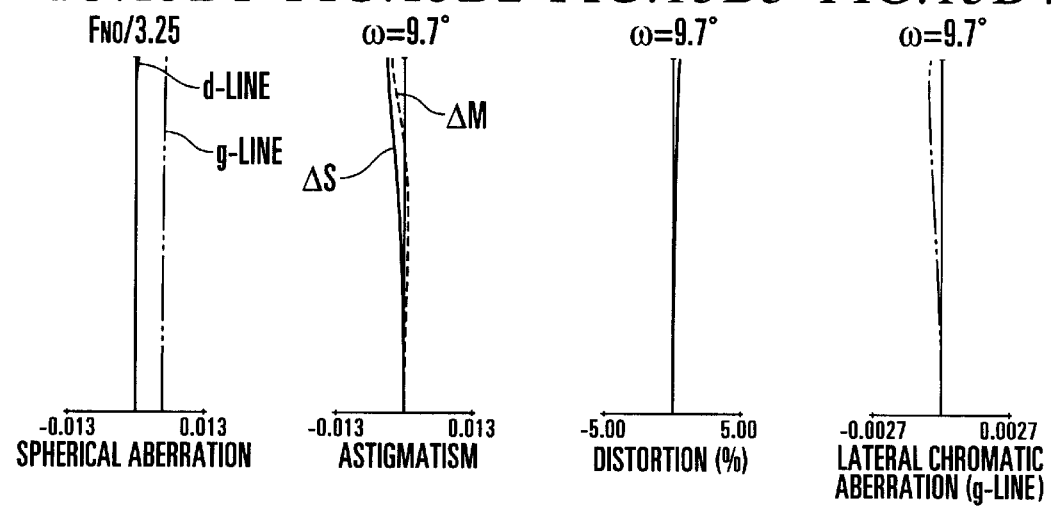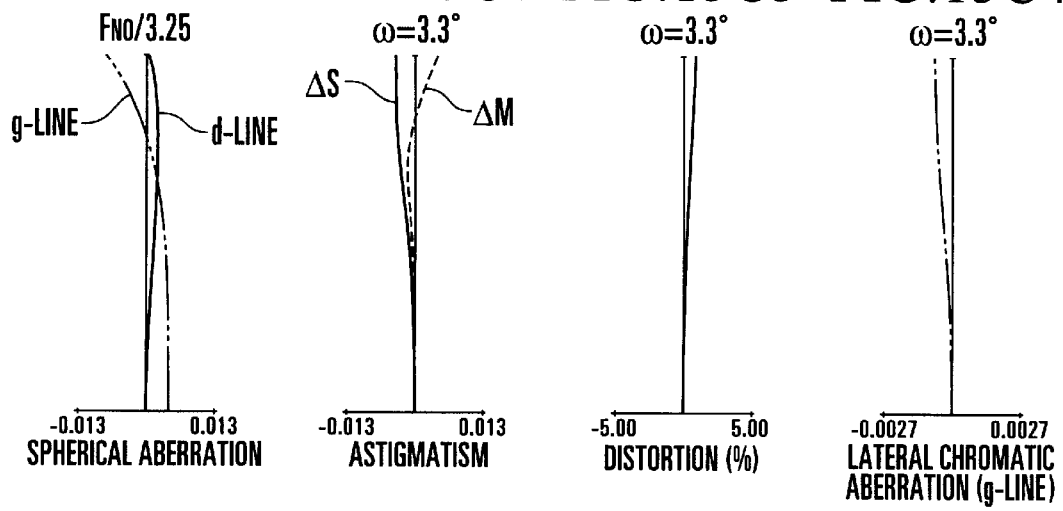

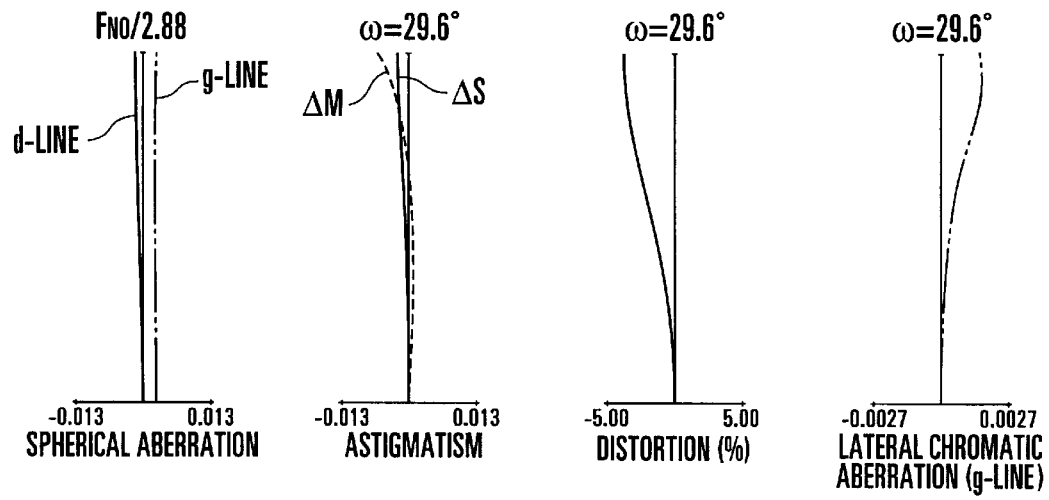
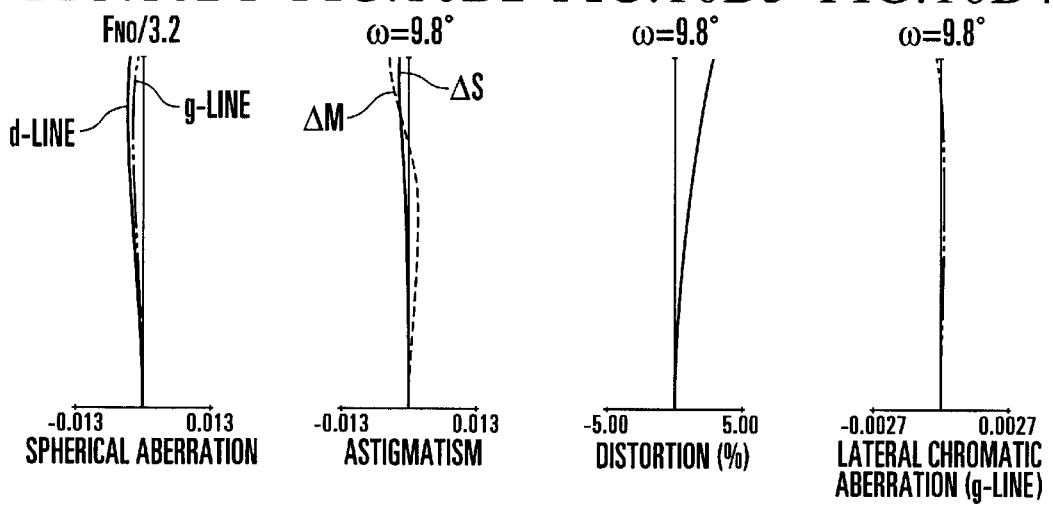
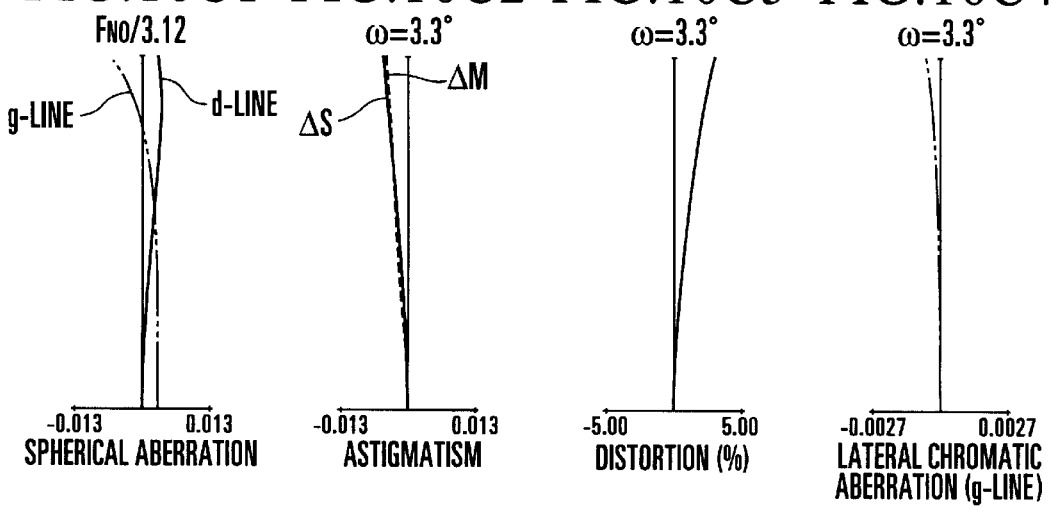

VARIABLE MAGNIFICATION OPTICAL SYSTEM AND OPTICAL APPARATUS HAVING THE SAME

BACKGROUND OF THE INVENTION

1. Field of the Invention

The present invention relates to a variable magnification optical system and an optical apparatus having the same, and more particularly, to a variable magnification optical system having an image stabilizing function, which is suitable for use in a video camera, a silver-halide photographic camera, an electronic still camera, etc., and which is capable of stabilizing a photographed image by moving a lens unit that is a part of the variable magnification optical system in such a way as to have a component having directions perpendicular to an optical axis to optically correct shaking of the photographed image obtained when the variable magnification optical system vibrates (tilts), so as to obtain a stationary image.

2. Description of Related Art

Heretofore, there have been proposed a variety of image-stabilizing optical systems having the function of preventing shaking of a photographed image due to the vibration of each optical system.

For example, in an image-stabilizing optical system disclosed in Japanese Laid-Open Patent Application No. Sho 56-21133, in response to an output signal of a detection means for detecting the vibration state of the optical system, an optical member that is a part of the optical system is moved in such a direction as to cancel the vibratory displacement of an image due to the vibration of the optical system, thereby stabilizing an image.

In a photographic system disclosed in Japanese Laid-Open Patent Application No. Sho 61-223819 (corresponding to U.S. Pat. No. 4,927,250), in which a variable angle prism is disposed on the most object side, the apex angle of the variable angle prism is varied in correspondence with the vibration of the photographic system, thereby stabilizing an image.

In photographic systems disclosed in Japanese Laid-Open Patent Application No. Hei 1-116619 (corresponding to U.S. Pat. No. 5,270,857) and Japanese Laid-Open Patent Application No. Hei 2-124521 (corresponding to U.S. Pat. No. 5,039,211), the vibration of the photographic system is detected by utilizing an acceleration sensor or the like, and, in response to an output signal of the acceleration sensor or the like, a lens unit that is a part of the photographic system is moved in directions perpendicular to an optical axis, thereby obtaining a stationary image.

In addition, in a variable magnification optical system disclosed in Japanese Laid-Open Patent Application No. Hei 7-128619, which has the four-unit structure having positive, negative, positive and positive lens units, the third lens unit being composed of two, positive and negative, lens subunits, the positive lens subunit of the third lens unit is moved in directions perpendicular to an optical axis to stabilize an image.

Further, in a variable magnification optical system disclosed in Japanese Laid-Open Patent Application No. Hei 7-199124 (corresponding to U.S. Pat. No. 5,585,966), which has the four-unit structure having positive, negative, positive and positive lens units, the whole third lens unit is moved in directions perpendicular to an optical axis to stabilize an image.

On the other hand, in Japanese Laid-Open Patent Application No. Hei 8-5913 (corresponding to U.S. Pat. No. 5,847,882 and U.S. Pat. No. 6,094,312), there is disclosed a variable magnification optical system having the five-unit structure having positive, negative, positive, positive and negative lens units, in which the variation of magnification is performed by moving the second and fourth lens units, thereby attaining the reduction of the diameter of a front lens member.

Further, in Japanese Laid-Open Patent Application No. Hei 10-197786, there is disclosed a variable magnification optical system having the five-unit structure having positive, negative, positive, negative and positive lens units, in which the fourth lens unit is moved in directions perpendicular to an optical axis to stabilize an image.

However, among the above-mentioned variable magnification optical systems having the image stabilizing function, optical systems each having a zoom ratio of 8 or more, although being adaptable for video cameras or the like, are insufficient for being used with electronic still cameras each having 1,000,000 pixels or more, in terms of the correction of aberration.

BRIEF SUMMARY OF THE INVENTION

It is an object of the invention to provide a variable magnification optical system having an image stabilizing function, which, while securing a zoom ratio to a given degree or more, is corrected well for aberration to such a degree that the variable magnification optical system is usable, for example, as a photographic system of an electronic still camera using an image sensor having 1,000,000 pixels or more.

To attain the above object, in accordance with an aspect of the invention, there is provided a variable magnification optical system, which comprises, in order from an object side to an image side, a first lens unit of positive optical power, a second lens unit of negative optical power, a third lens unit of positive optical power, a fourth lens unit of negative optical power and a fifth lens unit of positive optical power. At least the second lens unit and the fourth lens unit are moved along an optical axis during a variation of magnification, and the third lens unit is moved in such a way as to have a component having directions perpendicular to the optical axis to displace an image formed by the variable magnification optical system.

In accordance with another aspect of the invention, there is provided an optical apparatus, which comprises the variable magnification optical system according to the above-mentioned aspect.

These and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 11A1 to 11A4, FIGS. 11B1 to 11B4 and FIGS. 11C1 to 11C4 are graphs showing various aberrations of the variable magnification optical system according to the numerical example 1 at the wide-angle end, the middle focal length position and the telephoto end, respectively.

FIGS. 12A1 to 12A4, FIGS. 12B1 to 12B4 and FIGS. 12C1 to 12C4 are graphs showing various aberrations of the variable magnification optical system according to the numerical example 2 at the wide-angle end, the middle focal length position and the telephoto end, respectively.

FIGS. 13A1 to 13A4, FIGS. 13B1 to 13B4 and FIGS. 13C1 to 13C4 are graphs showing various aberrations of the variable magnification optical system according to the numerical example 3 at the wide-angle-end, the middle focal length position and the telephoto end, respectively.

FIGS. 14A1 to 14A4, FIGS. 14B1 to 14B4 and FIGS. 14C1 to 14C4 are graphs showing various aberrations of the variable magnification optical system according to the numerical example 4 at the wide-angle end, the middle focal length position and the telephoto end, respectively.

FIGS. 15A1 to 15A4, FIGS. 15B1 to 15B4 and FIGS. 15C1 to 15C4 are graphs showing various aberrations of the variable magnification optical system according to the numerical example 5 at the wide-angle end, the middle focal length position and the telephoto end, respectively.

FIGS. 16A1 to 16A4, FIGS. 16B1 to 16B4 and FIGS. 16C1 to 16C4 are graphs showing various aberrations of the variable magnification optical system according to the numerical example 6 at the wide-angle end, the middle focal length position and the telephoto end, respectively.

DETAILED DESCRIPTION OF THE INVENTION

Hereinafter, preferred embodiments of the invention will be described in detail with reference to the drawings.
(First Embodiment)

Figure 1:
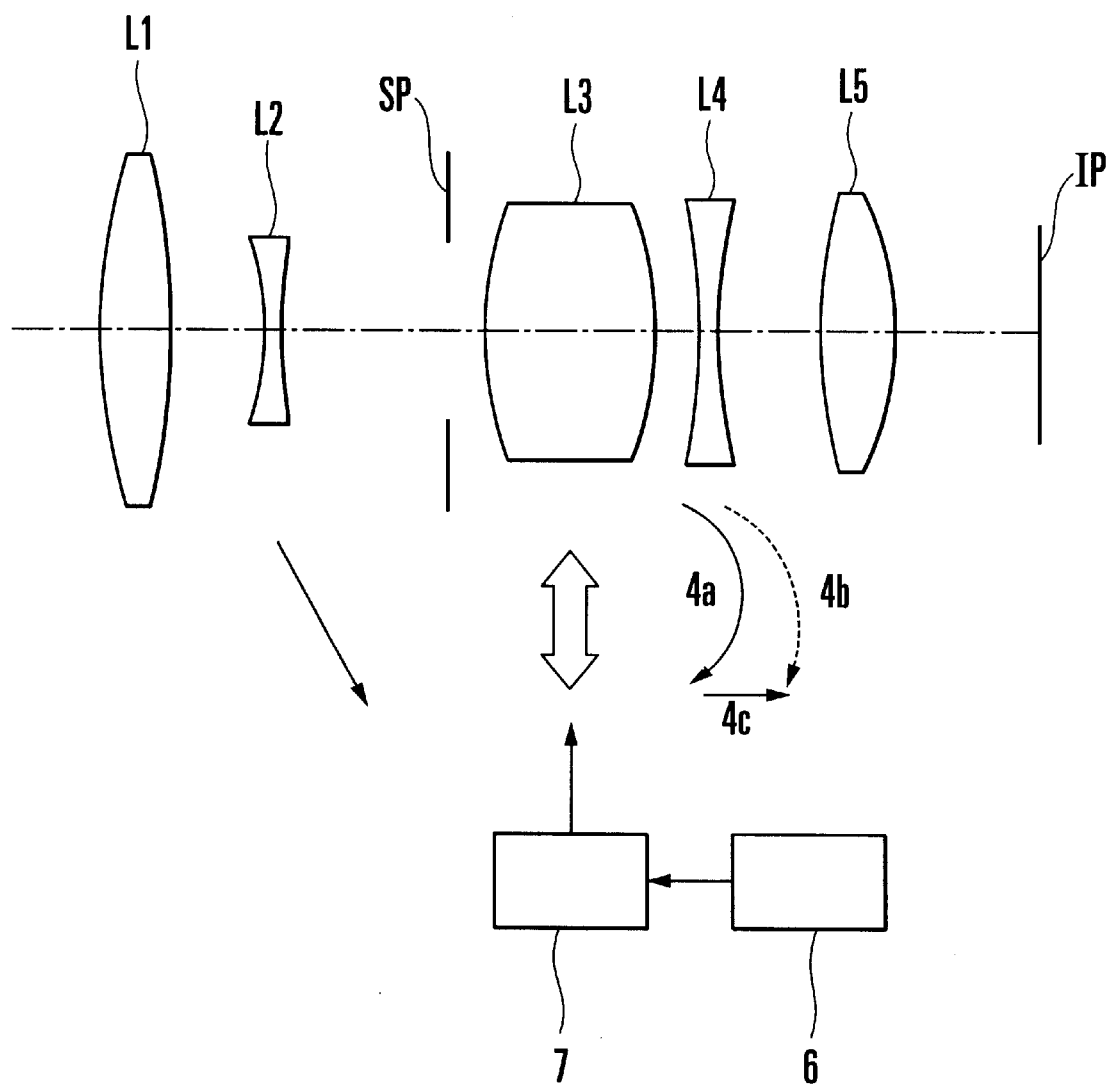
FIG. 1 is an outline diagram showing a paraxial refractive power arrangement of a variable magnification optical system according to a first embodiment of the invention.

FIG. 1 is a lens block diagram showing a paraxial refractive power arrangement of a variable magnification optical system having an image stabilizing function according to a first embodiment of the invention.

In FIG. 1, reference character L1 denotes a first lens unit of positive refractive power, reference character L2 denotes a second lens unit of negative refractive power, reference character L3 denotes a third lens unit of positive refractive power, reference character L4 denotes a fourth lens unit of negative refractive power, and reference character L5 denotes a fifth lens unit of positive refractive power. Reference character SP denotes an aperture stop, which is disposed before the third lens unit L3. Reference character IP denotes an image plane, which corresponds to an image pickup plane of an image sensor, such as a CCD or an MOS. Reference numeral 6 denotes a vibration detecting means, such as an acceleration sensor (velocity sensor) for detecting the condition of vibration of the optical system, and reference numeral 7 denotes a driving means, such as an actuator for moving the third lens unit L3 in such a way as to have a component having directions perpendicular to an optical axis of the optical system, on the basis of information provided by the vibration detecting means 6.

In the variable magnification optical system according to the first embodiment, the variation of magnification from the wide-angle end to the telephoto end is effected by moving the second lens unit L2 toward the image side, and the shift of an image plane caused by the variation of magnification is compensated for by moving the fourth lens unit L4, as indicated by arrows shown in FIG. 1. Further, the so-called rear focusing method in which focusing is effected by moving the fourth lens unit L4 along the optical axis is employed. A solid-line curve 4a and a dashed-line curve 4b shown in FIG. 1 represent movement loci of the fourth lens unit L4 for compensating for the shift of an image plane caused by the variation of magnification from the wide-angle end to the telephoto end when focusing is performed on an infinitely distant object and on a minimum-distance object, respectively. In the variable magnification optical system according to the first embodiment, focusing from an infinitely distant object to a minimum-distance object is effected by moving the fourth lens unit L4 rearward (toward the image side). For example, the focusing from an infinitely distant object to a minimum-distance object at the telephoto end is effected by moving the fourth lens unit L4 rearward as indicated by a straight line 4c shown in FIG. 1. It is to be noted that the first lens unit L1, the third lens unit L3 and the fifth lens unit L5 remain stationary during the variation of magnification and during focusing, i.e., do not move for the variation of magnification and for focusing.

In the variable magnification optical system according to the first embodiment, the fourth lens unit L4 is moved to compensate for the shift of an image plane caused by the variation of magnification and the fourth lens unit L4 is also moved to effect focusing. In particular, the fourth lens unit L4 is moved in such a way as to have a locus convex toward the image side, as indicated by the curves 4a and 4b shown in FIG. 1, during the variation of magnification from the wide-angle end to the telephoto end. This arrangement makes it possible to effectively utilize a space behind the third lens unit L3, thereby effectively attaining the shortening of the total length of the entire optical system.

In the variable magnification optical system according to the first embodiment, the shaking of a photographed image occurring when the whole variable magnification optical system vibrates (tilts) is corrected by detecting the vibration of the variable magnification optical system with the vibration detecting means 6 and moving, with the driving means 7, the third lens unit L3 in directions perpendicular to the optical axis on the basis of information as detected.
(Second Embodiment)

Figure 2:
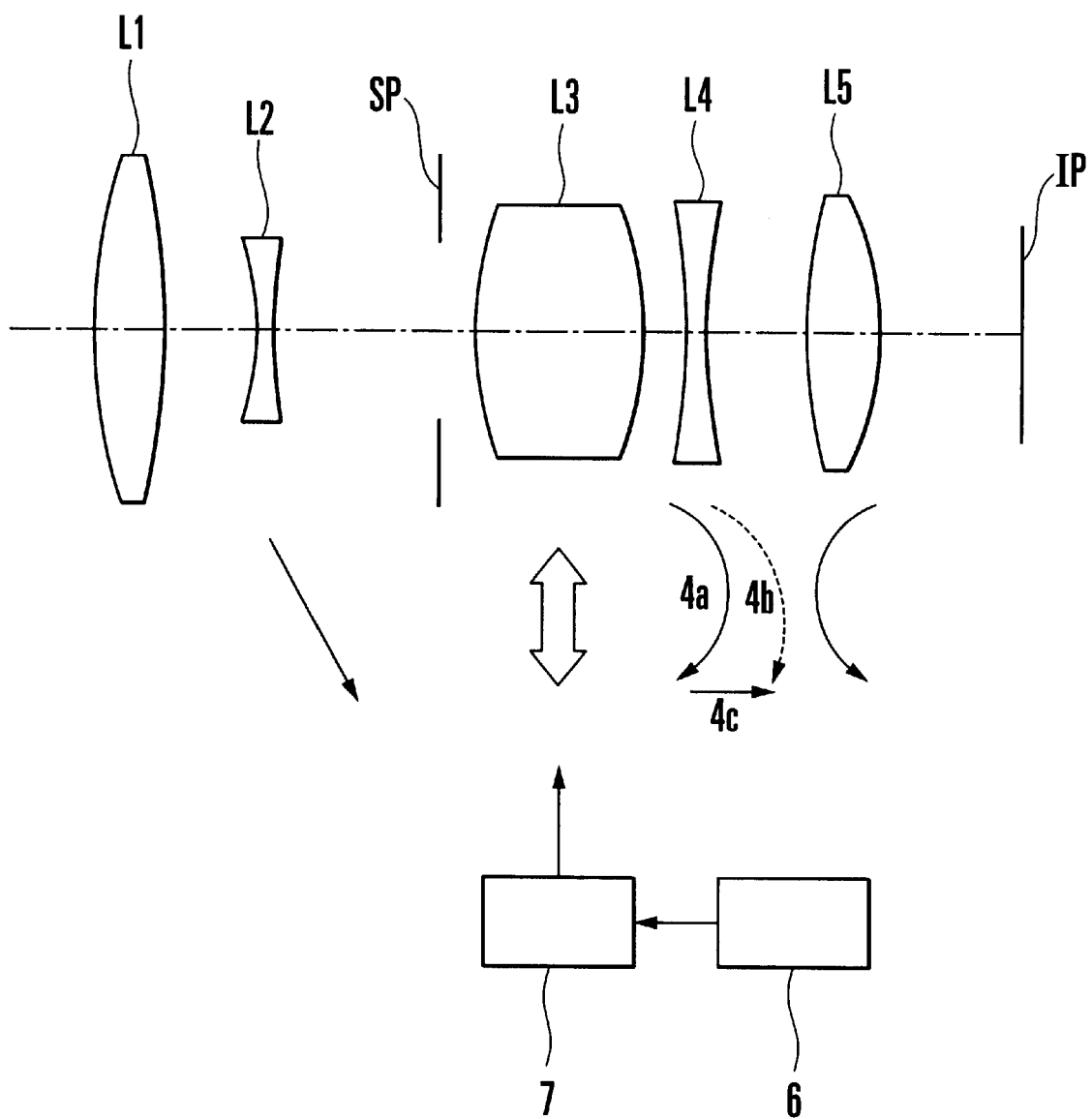
FIG. 2 is an outline diagram showing a paraxial refractive power arrangement of a variable magnification optical system according to a second embodiment of the invention.

FIG. 2 is a lens block diagram showing a paraxial refractive power arrangement of a variable magnification-optical system having an image stabilizing function according to a second embodiment of the invention. The second embodiment differs from the first embodiment in that, in the variable magnification optical system according to the second embodiment, during the variation of magnification from the wide-angle end to the telephoto end, the fifth lens unit L5 is moved with a locus convex toward the object side as indicated by an arrow shown in FIG. 2, so that it is possible to further reduce the variation of aberration due to the variation of magnification as compared with the first embodiment.

(Third Embodiment)

Figure 3:
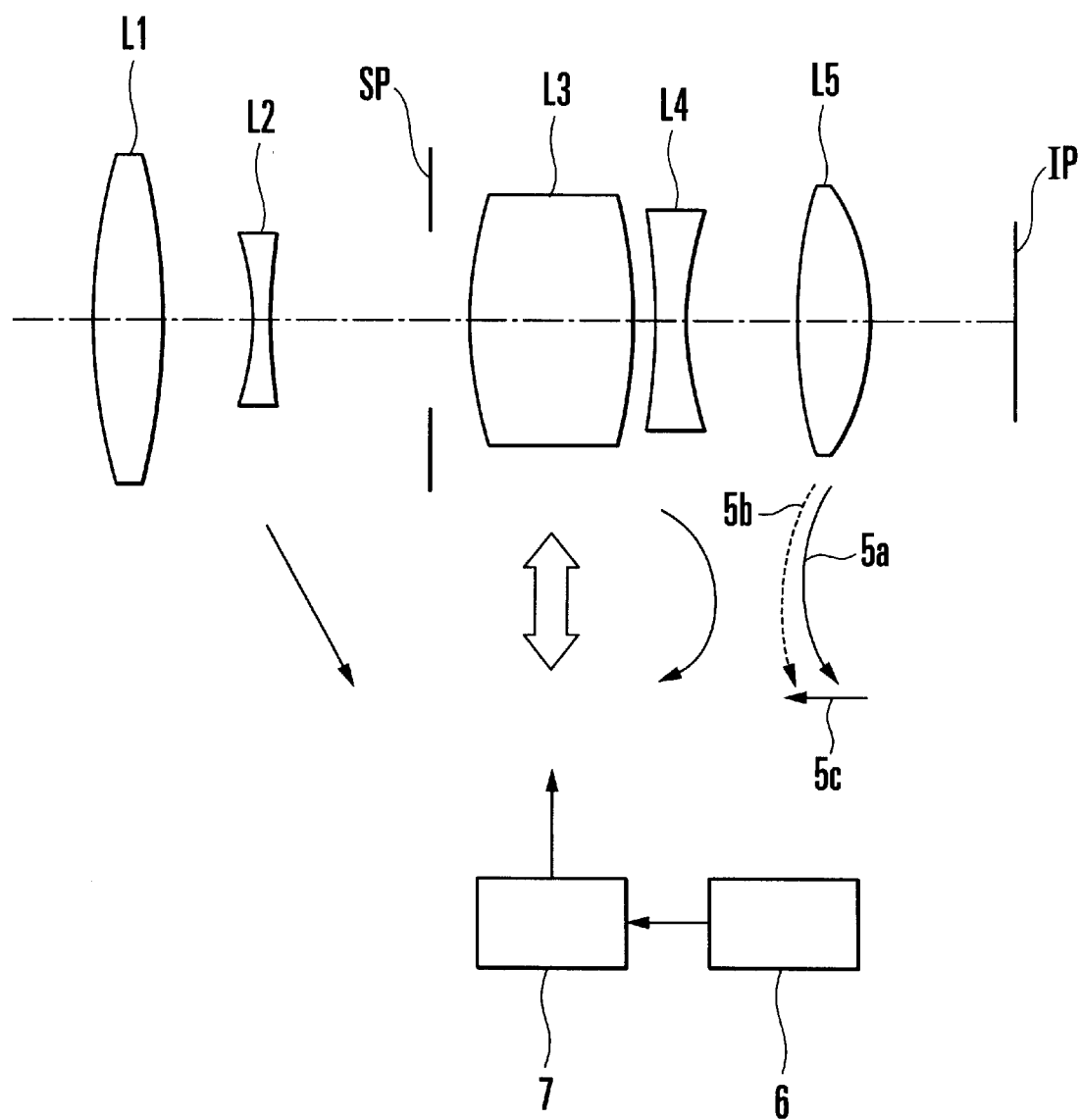
FIG. 3 is an outline diagram showing a paraxial refractive power arrangement of a variable magnification optical system according to a third embodiment of the invention.

FIG. 3 is a lens block diagram showing a paraxial refractive power arrangement of a variable magnification optical system having an image stabilizing function according to a third embodiment of the invention. The third embodiment differs from the first embodiment in that, in the variable magnification optical system according to the third embodiment, during the variation of magnification from the wide-angle end to the telephoto end, the fifth lens unit L5 is moved with a locus convex toward the object side as indicated by an arrow shown in FIG. 3, so that it is possible to further reduce the variation of aberration due to the variation of magnification, and in that focusing is effected by moving the fifth lens unit L5 along the optical axis.

A solid-line curve 5a and a dashed-line curve 5b shown in FIG. 3 represent movement loci of the fifth lens unit L5 for compensating for the shift of an image plane caused by the variation of magnification from the wide-angle end to the telephoto end when focusing is performed on an infinitely distant object and on a minimum-distance object, respectively. In the variable magnification optical system according to the third embodiment, focusing from an infinitely distant object to a minimum-distance object is effected by moving the fifth lens unit L5 forward (toward the object side). For example, the focusing from an infinitely distant object to a minimum-distance object at the telephoto end is effected by moving the fifth lens unit L5 forward as indicated by a straight line 5c shown in FIG. 3.

Next, the optical principle concerning the image-stabilizing function of an optical system for correcting the shaking of a photographed image by moving a lens unit in directions perpendicular to the optical axis, which is common to the above-described first to third embodiments, is described with reference to FIGS. 4A to 4D.

Figure 4A:
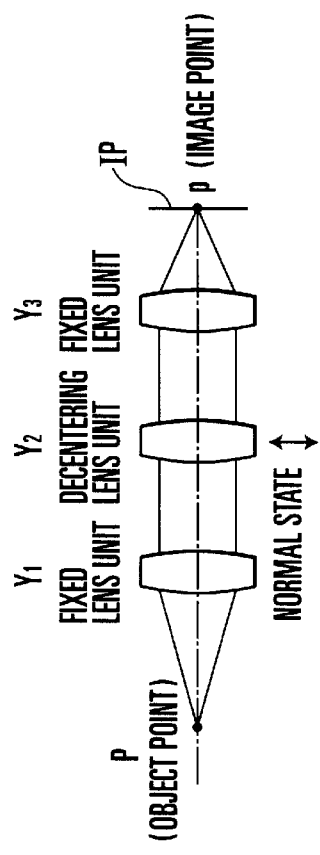
FIGS. 4A to 4D are diagrams for explaining the optical principle of an image stabilizing function.

It is here assumed that, as shown in FIG. 4A, the optical system is composed of three parts, i.e., a fixed lens unit Y1, a decentering lens unit (shift lens unit) Y2 and a fixed lens unit Y3, and an object point P on the optical axis, which is sufficiently distant from the optical system, is imaged, as an image point p, on the center of an image pickup plane IP.

Figure 4B:
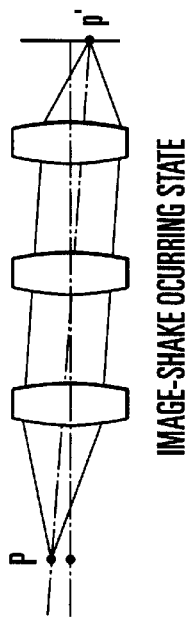

Assuming now that the whole optical system including the image pickup plane IP is made to instantaneously tilt by the vibration of the optical system, as shown in FIG. 4B, an image of the object point P also instantaneously moves from the image point p to an image point p', causing image shaking.

Figure 4C:
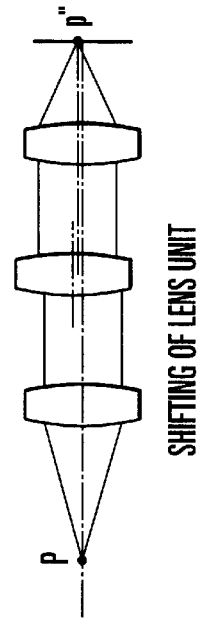
Figure 4D:
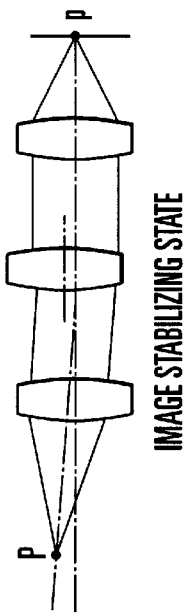
Figure 5:
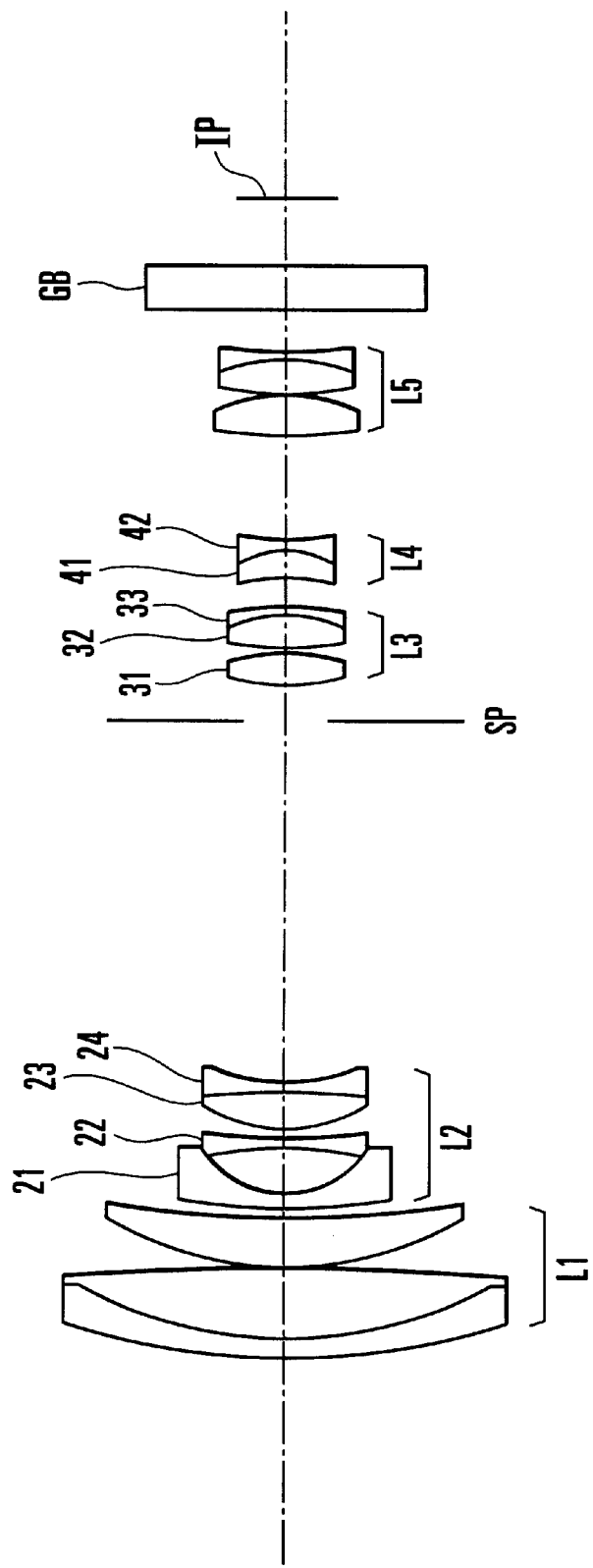
FIG. 5 is a lens sectional view of a variable magnification optical system according to a numerical example 1 at the wide-angle end.
Figure 6:
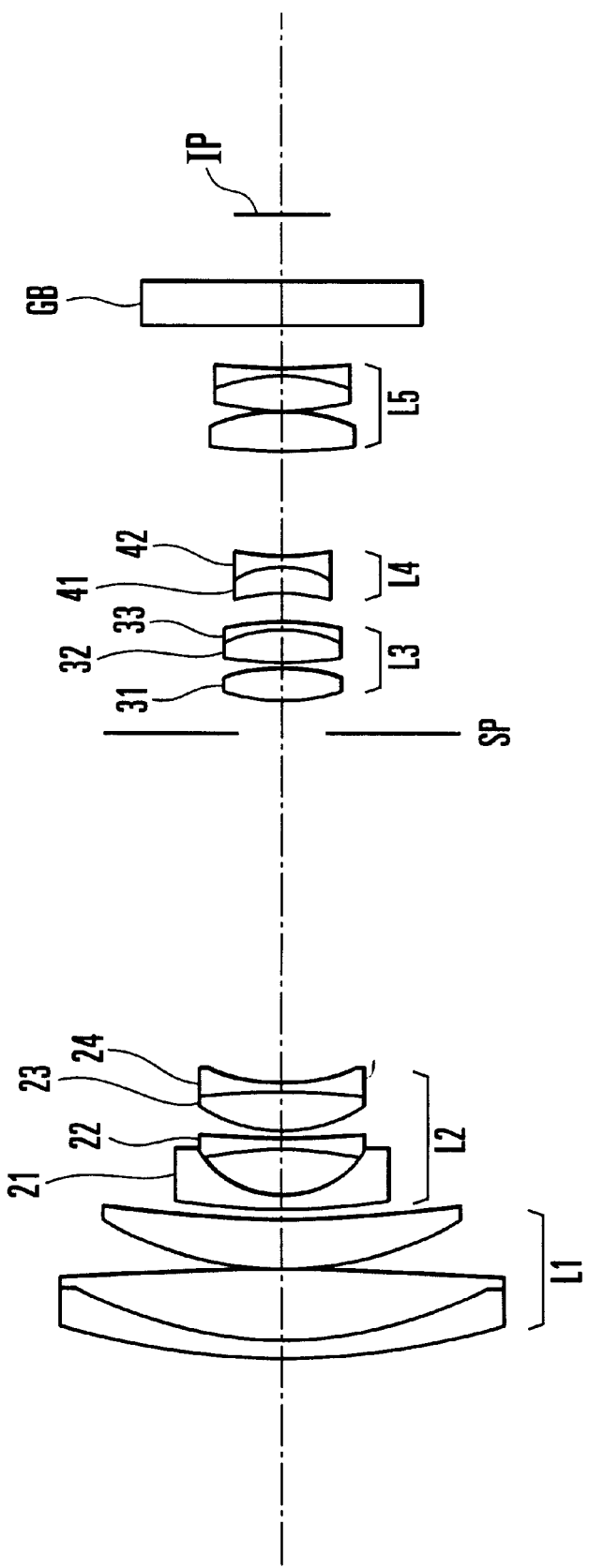
FIG. 6 is a lens sectional view of a variable magnification optical system according to a numerical example 2 at the wide-angle end.
Figure 7:
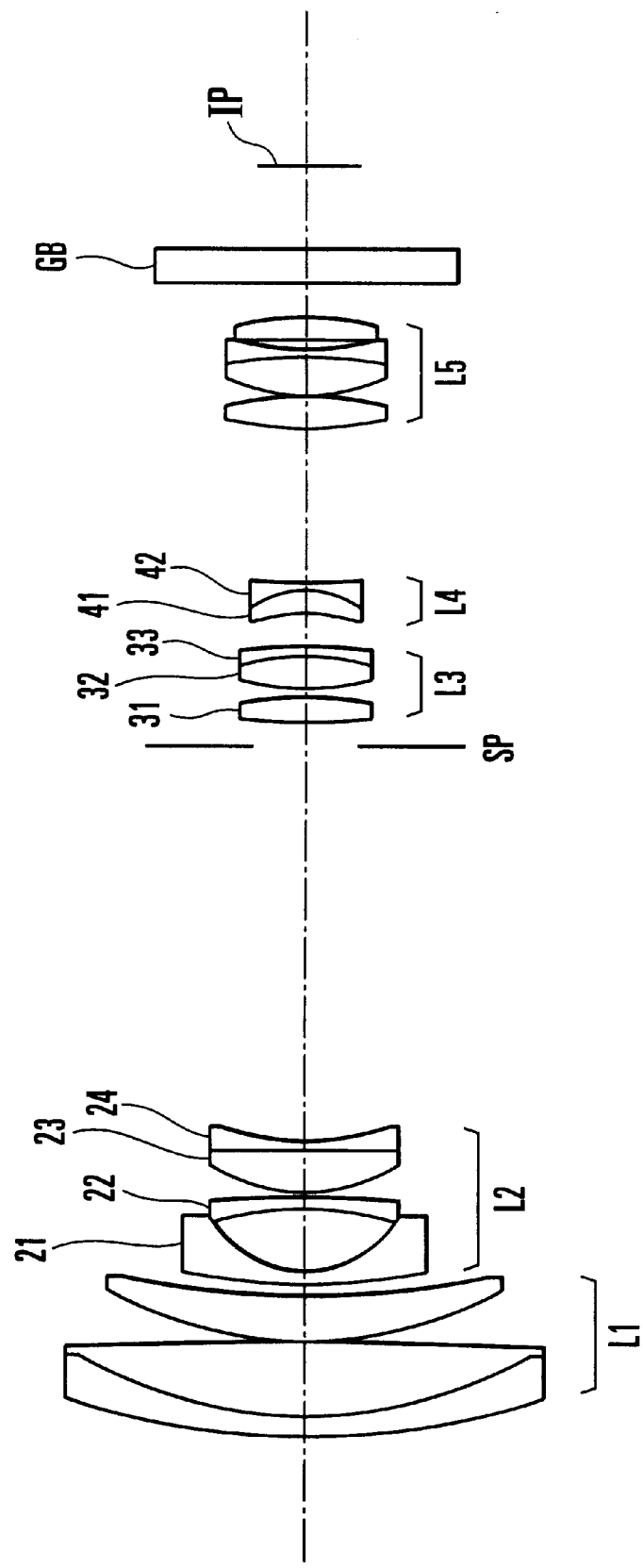
FIG. 7 is a lens sectional view of a variable magnification optical system according to a numerical example 3 at the wide-angle end.
Figure 8:
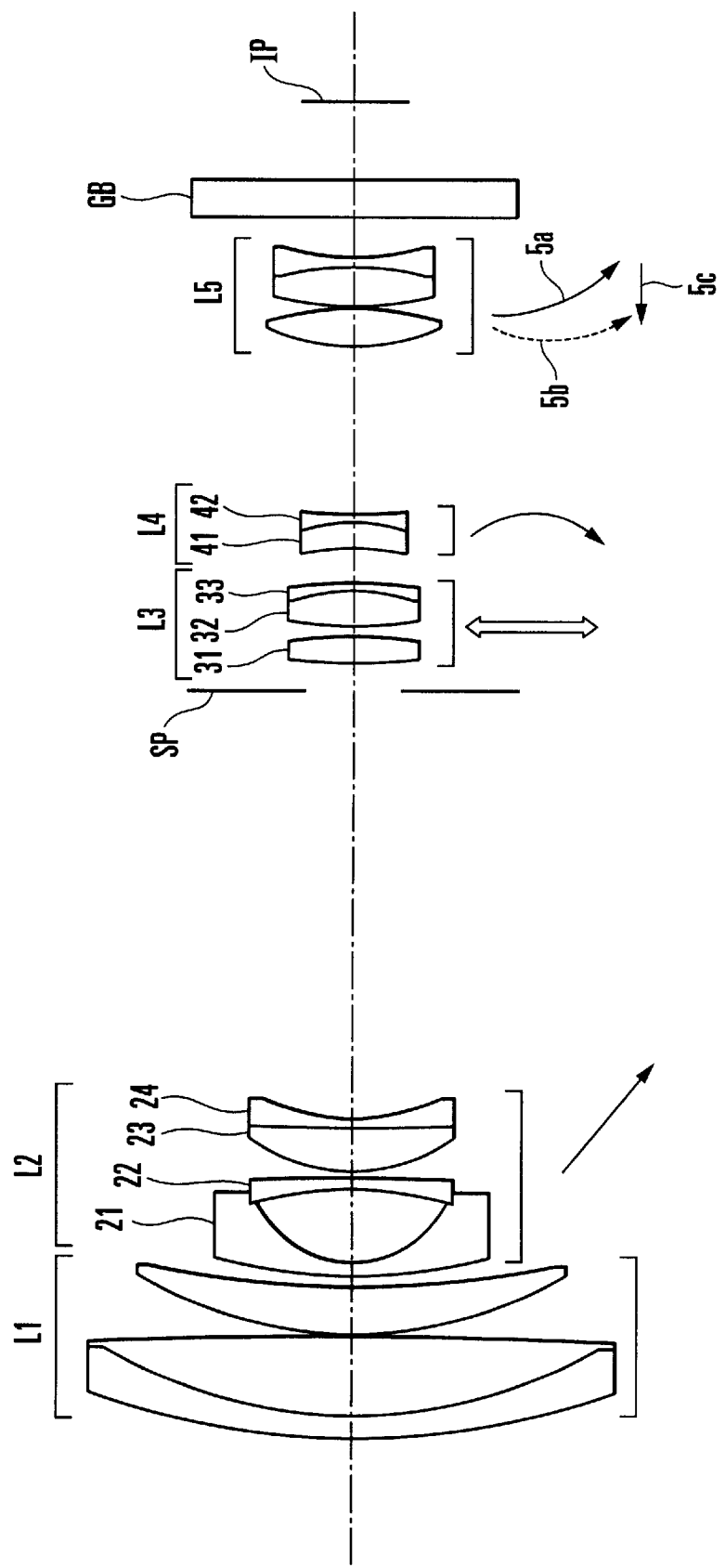
FIG. 8 is a lens sectional view of a variable magnification optical system according to a numerical example 4 at the wide-angle end.
Figure 9:
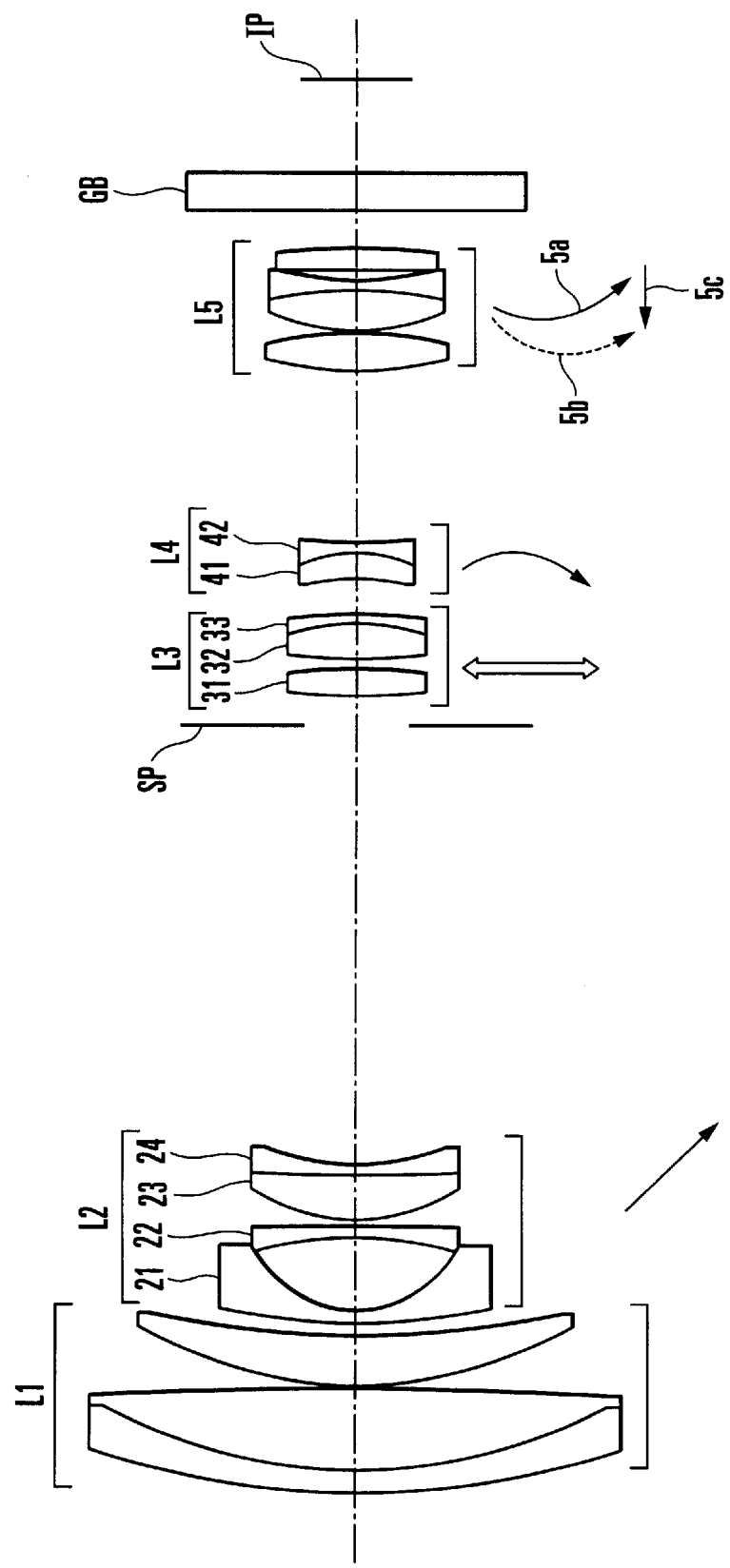
FIG. 9 is a lens sectional view of a variable magnification optical system according to a numerical example 5 at the wide-angle end.
Figure 10:
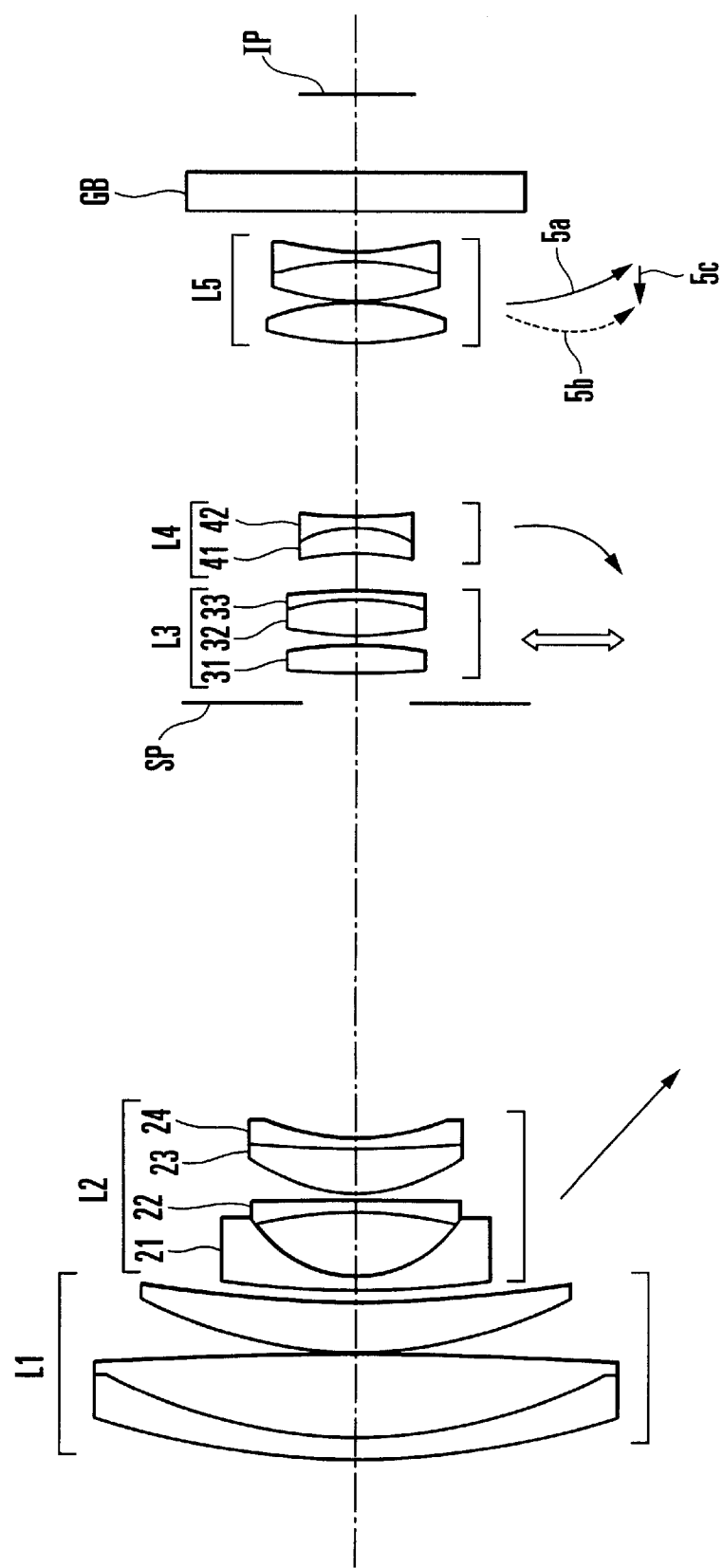
FIG. 10 is a lens sectional view of a variable magnification optical system according to a numerical example 6 at the wide-angle end.

On the other hand, if the decentering lens unit Y2 is made to move in a direction perpendicular to the optical axis, as shown in FIG. 4C, the image point p moves to a point p". Then, the amount of movement and the direction of movement of the image point p depend on the refractive power arrangement of the optical system and are represented as the decentering sensitivity of the decentering lens unit Y2. Thus, the image point p', which has shifted due to the vibration of the optical system as shown in FIG. 4B, is made to return to the original image point p by moving the decentering lens unit Y2 as much as an appropriate amount in a direction perpendicular to the optical axis, so that an image-shake correction, i.e., image stabilization, is performed as shown in FIG. 4D.

Now, when the focal length of the entire optical system is denoted by f, and the decentering sensitivity of the decentering lens unit Y2 is denoted by TS, the amount of movement Δ of the decentering lens unit Y2 required for correcting image shaking caused by the tilt of the optical axis by θ° is expressed by the following equation:

$$\Delta = f \cdot \tan(\theta)/TS.$$

If the decentering sensitivity TS of the decentering lens unit Y2 is too large, the amount of movement Δ becomes a small value, so that the amount of movement of the decentering lens unit Y2 required for the image stabilization can be made small. However, such a control operation as to appropriately perform the image stabilization becomes difficult, leaving uncorrected image shaking.

In particular, in the case of a video camera or a digital still camera, the image size of an image sensor, such as a CCD, is small as compared with a silver-halide film, and the focal length with respect to one and the same angle of view is short. Therefore, even if the angle of inclination of the optical axis caused by the vibration of the optical system is one and the same, the amount of movement Δ of the decentering lens unit Y2 for correction of such image shaking becomes small. Accordingly, assuming that mechanisms for driving the decentering lens unit Y2 have the same degree of mechanical precision, an uncorrected image shaking left on the image plane would become relatively large.

On the other hand, if the decentering sensitivity TS of the decentering lens unit Y2 is too small, the amount of movement of the decentering lens unit Y2 required for controlling the correction of image shaking becomes large, so that a driving means, such as an actuator, for driving the decentering lens unit Y2 also becomes large in size and requires a large output. Accordingly, the size of the whole optical system becomes large disadvantageously.

Therefore, in the variable magnification optical system according to each of the first to third embodiments, by appropriately setting the refractive power arrangement of each lens unit, the decentering sensitivity TS of the third lens unit L3, which serves as the decentering lens unit Y2, is set to an appropriate value, so as to attain an optical system in which uncorrected image shaking left due to the control error is small and the load of a driving means, such as an actuator, is also small.

In the variable magnification optical system according to each of the first to third embodiments, the decentering sensitivity TS3 of the third lens unit L3 at the telephoto end is expressed by the following equation:

$$TS3 = (1-\beta 3) \cdot \beta 45$$

where β3 is a magnification of the third lens unit L3 at the telephoto end, and β45 is a composite magnification of the fourth lens unit L4 and the fifth lens unit L5 at the telephoto end.

In the variable magnification optical system according to each of the first to third embodiments, the decentering sensitivity TS3 represented by the right side of the above equation is so set as to satisfy the following condition:

$$0.3 < |(1-\beta 3) \cdot \beta 45| < 3 \qquad (1).$$

If the lower limit of the condition (1) is exceeded, the sensitivity of the third lens unit L3 serving as the decentering lens unit becomes too small, so that the amount of movement of the third lens unit L3 required for the image stabilization becomes too large. On the other hand, if the upper limit of the condition (1) is exceeded, the sensitivity of the third lens unit L3 becomes too large, so that it becomes difficult to control the image stabilization.

Further, in order to shorten the total length of the optical system while securing a predetermined variable magnification ratio (zoom ratio) and to set the sensitivity of the third lens unit L3 within a range defined by the condition (1), it is desirable to satisfy the following conditions:

$$1.6 < f3/fw < 4 \quad (2)$$

$$4 < ft/fw < 23 \quad (3)$$

where f3 is the focal length of the third lens unit L3, fw is the focal length at the wide-angle end of the entire optical system, and ft is the focal length at the telephoto end of the entire optical system.

If the focal length of the third lens unit L3 becomes short beyond the lower limit of the condition (2), the decentering sensitivity of the third lens unit L3 becomes too large, or it becomes impossible to correct the variation of aberration during the image stabilization. On the other hand, if the upper limit of the condition (2) is exceeded, the total length of the optical system increases, and the decentering sensitivity of the third lens unit L3 becomes too small, so that the amount of shift (the amount of movement) of the third lens unit L3 required for the image stabilization becomes too large.

Further, if the lower limit of the condition (3) is exceeded, it becomes impossible to secure a predetermined zoom ratio. If the upper limit of the condition (3) is exceeded, it becomes difficult to correct aberration.

Further, in order to obtain a sufficient effect of the image stabilization, it is preferable to satisfy the following condition:

$$1.7 \times 10^{-3} < |(1-\beta 3) \cdot \beta 45| \cdot EM/ft < 0.05 \quad (4)$$

where EM is a maximum amount of movement of the third lens unit L3 in directions perpendicular to the optical axis at the telephoto end.

If the lower limit of the condition (4) is exceeded, the amount of correction is too small to obtain a sufficient effect of the image stabilization. If the upper limit of the condition (4) is exceeded, it becomes necessary to increase the diameter of the third lens unit L3, so that a load on the driving means, such as an actuator, for the third lens unit L3 becomes large.

Further, in order to shorten the total length of the optical system while keeping high optical performance, it is preferable to satisfy the following condition:

$$0.3 < |f2/\sqrt{fw \cdot ft}| < 0.6 \quad (5)$$

where f2 is the focal length of the second lens unit L2.

If the refractive power of the second lens unit L2 becomes strong (the focal length of the second lens unit L2 becomes short) beyond the lower limit of the condition (5), although the amount of movement of the second lens unit during the variation of magnification becomes small, the Petzval sum increases in the negative direction in whole, so that it becomes difficult to correct the curvature of field. On the other hand, if the refractive power of the second lens unit L2 becomes weak (the focal length of the second lens unit L2 becomes long) beyond the upper limit of the condition (5), the amount of movement of the second lens unit L2 during the variation of magnification becomes large, so that the size of the whole optical system increases, and a disadvantage arises due to a change of the amount of marginal light during the image stabilization.

Further, in the variable magnification optical system according to each of the second and third embodiments, in which the fifth lens unit L5 is moved during the variation of magnification, in order to effectively compensate for the shift of an image plane due to the variation of magnification while attaining the reduction in size of the whole optical system, and in order to lessen the variation of aberration during the image stabilization, it is desirable to satisfy the following condition:

$$0.1 < M5/fw < 0.4 \quad (6)$$

where M5 is a maximum amount of movement of the fifth lens unit L5 during the variation of magnification when focusing is performed on an infinitely distant object (the amount of movement by which the fifth lens unit L5 moves from a position where it is located on the most image side to a position where it is located on the most object side, or conversely, from the position where it is located on the most object side to the position where it is located on the most image side).

If the amount of movement of the fifth lens unit L5 becomes small beyond the lower limit of the condition (6), the effect of compensation for the shift of an image plane by the movement of the fifth lens unit L5 becomes small, so that there is no sense in moving the fifth lens unit L5 during the variation of magnification. On the other hand, if the amount of movement of the fifth lens unit L5 becomes too large beyond the upper limit of the condition (6), the diameter of a front lens member to be determined by a marginal image height in the middle zone of zooming becomes large disadvantageously.

In order to secure a predetermined variable magnification ratio while obtaining the effect provided by the condition (6), it is preferable to satisfy the above-mentioned condition (3) and the condition (6) simultaneously.

Incidentally, in a case where a problem arises in a change of the amount of light at a marginal portion of the image plane during image stabilization, the aperture diameter of the aperture stop SP is decreased on the telephoto side to limit a central light flux, so that the amount of light at the marginal portion is relatively increased. Accordingly, it is possible to realize the reduction of a change of the amount of light during image stabilization.

Next, the variable magnification optical systems according to the above-described first to third embodiments are described on the basis of concrete numerical examples. FIGS. 5 to 10 are lens sectional views showing variable magnification optical systems corresponding to numerical examples 1 to 6 at the wide-angle end. The numerical examples 1 and 2 correspond to the variable magnification optical system according to the first embodiment, in which the fifth lens unit L5 remains stationary during the variation of magnification. The numerical example 3 corresponds to the variable magnification optical system according to the second embodiment, in which the fifth lens unit L5 is moved during the variation of magnification. The numerical examples 4 to 6 correspond to the variable magnification optical system according to the third embodiment, in which the fifth lens unit L5 is moved during the variation of magnification and during focusing. In FIGS. 5 to 10, reference character GB denotes a glass block, which is illustrated to represent an optical member having no refractive power, such as an infrared-cut filter, an optical low-pass filter, a face plate or the like.

FIGS. 11A1 to 11A4, FIGS. 11B1 to 11B4 and FIGS. 11C1 to 11C4 are graphs showing various aberrations of the variable magnification optical system according to the numerical example 1 at the wide-angle end, the middle focal length position and the telephoto end, respectively. FIGS. 12A1 to 12A4, FIGS. 12B1 to 12B4 and FIGS. 12C1 to 12C4 are graphs showing various aberrations of the variable magnification optical system according to the numerical example 2 at the wide-angle end, the middle focal length position and the telephoto end, respectively. FIGS. 13A1 to 13A4, FIGS. 13B1 to 13B4 and FIGS. 13C1 to 13C4 are graphs showing various aberrations of the variable magnification optical system according to the numerical example 3 at the wide-angle end, the middle focal length position and the telephoto end, respectively. FIGS. 14A1 to 14A4, FIGS. 14B1 to 14B4 and FIGS. 14C1 to 14C4 are graphs showing various aberrations of the variable magnification optical system according to the numerical example 4 at the wide-angle end, the middle focal length position and the telephoto end, respectively. FIGS. 15A1 to 15A4, FIGS. 15B1 to 15B4 and FIGS. 15C1 to 15C4 are graphs showing various aberrations of the variable magnification optical system according to the numerical example 5 at the wide-angle end, the middle focal length position and the telephoto end, respectively. FIGS. 16A1 to 16A4, FIGS. 16B1 to 16B4 and FIGS. 16C1 to 16C4 are graphs showing various aberrations of the variable magnification optical system according to the numerical example 6 at the wide-angle end, the middle focal length position and the telephoto end, respectively. In these aberration graphs, "d" denotes d-line, "g" denotes g-line, $\Delta M$ denotes a meridional image surface, and $\Delta S$ denotes a sagittal image surface.

In the variable magnification optical systems according to the numerical examples 1 to 6, in order to decrease decentering aberration occurring during image stabilization, particularly, decentering lateral chromatic aberration, at least one negative lens is included in the third lens unit L3 of positive refractive power, thereby decreasing chromatic aberration occurring at the third lens unit L3.

Further, in order to decrease decentering coma occurring during image stabilization, it is necessary to decrease spherical aberration occurring at the third lens unit L3 into a given range. Accordingly, it is preferable to construct the third lens unit L3 with at least two positive lenses and at least one negative lens.

With the above construction taken into consideration, in the numerical examples 1 to 6, which are shown in FIGS. 5 to 10, respectively, the third lens unit L3 is constructed with, in order from the object side to the image side, a positive lens 31, and a cemented lens composed of a positive lens 32 and a negative lens 33 having a strong concave surface facing the object side. Thus, the whole third lens unit L3 is formed into the telephoto construction to shorten the principal point interval between the second lens unit L2 and the third lens unit L3, thereby attaining the shortening of the total length of the optical system.

Further, the fourth lens unit L4 is constructed with one positive lens 41 and one negative lens 42, thereby decreasing the variation of spherical aberration and curvature of field due to the movement of the fourth lens unit L4 during the variation of magnification or during focusing. Incidentally, in order to correct the variation of astigmatism or distortion during the variation of magnification, an aspheric surface may be introduced into the fourth lens unit L4.

In an optical system required to have a high resolving power as a photographic system for use with a digital still camera, it is necessary to correct further well the variation of lateral chromatic aberration due to the variation of magnification, as compared with a photographic system for use with a general video camera (for a moving image). For that purpose, it is desirable that the second lens unit L2 of negative refractive power, which is a main magnification-varying lens unit, includes at least three negative lenses and at least one positive lens. The reason for this arrangement is that, if the refractive power of the second lens unit L2 is made large to lessen the amount of movement thereof for the purpose of shortening the total length of the optical system, it becomes difficult to correct lateral chromatic aberration with only two negative lenses.

In the numerical examples 1 to 6, the second lens unit L2 is constructed with, in order from the object side to the image side, a negative meniscus lens 21 having a concave surface facing the image side, a negative lens 22, a positive lens 23 and a negative lens 24, so that the symmetry between front and rear portions of the second lens unit L2 is made small to enhance the achromatic effect of the principal point, thereby correcting lateral chromatic aberration effectively.

In this instance, in order to more effectively correct lateral chromatic aberration, it is desirable to satisfy the following condition:

$$1.4 < |f24/f2| < 4.6 \tag{7}$$

where f24 is the focal length of the negative lens 24 disposed on the most image side of the second lens unit L2.

If the focal length of the negative lens 24 becomes too small beyond the upper limit of the condition (7), the effect of correction of chromatic aberration becomes insufficient. On the other hand, if the lower limit of the condition (7) is exceeded, it becomes difficult to correct distortion at the wide-angle end.

Next, numerical data of the numerical examples 1 to 6 of the invention are shown. In the numerical data of the numerical examples 1 to 6, Ri denotes the radius of curvature of the i-th surface, when counted from the object side, Di denotes the i-th optical member thickness or air separation, when counted from the object side, and Ni and vi respectively denote the refractive index and Abbe number of the i-th optical member, when counted from the object side.

The shape of an aspheric surface is expressed in the coordinates with an X axis in the optical axis direction and an H axis in a direction perpendicular to the optical axis, the direction in which light advances being taken as positive, by the following equation:

$$X = \frac{(1/R)H^2}{1 + \sqrt{1 - (1+k)(H/R)^2}} + BH^4 + CH^6 + DH^8$$

where R is the radius of osculating sphere, and k, B, C and D are aspheric coefficients.

Further, the indication "e-X" means "$\times 10^{-X}$".

In addition, the values of the factors in the above-mentioned conditions (1) to (7) for the numerical examples 1 to 6 are listed in Table-1.

Numerical Example 1:
f = 1 – 9.63    Fno = 2.88 – 3.58    $2\omega$ = 61.8° – 7.1°

| R 1 = 9.913 | D 1 = 0.25 | N 1 = 1.846660 | υ 1 = 23.8 |
|---|---|---|---|
| R 2 = 5.607 | D 2 = 0.97 | N 2 = 1.487490 | υ 2 = 70.2 |
| R 3 = –35.345 | D 3 = 0.04 | | |
| R 4 = 4.785 | D 4 = 0.54 | N 3 = 1.696797 | υ 3 = 55.5 |
| R 5 = 13.699 | D 5 = Variable | | |
| R 6 = 11.253 | D 6 = 0.14 | N 4 = 1.834807 | υ 4 = 42.7 |
| R 7 = 1.258 | D 7 = 0.65 | | |
| R 8 = –6.098 | D 8 = 0.12 | N 5 = 1.696797 | υ 5 = 55.5 |

-continued

```
R  9 =  10.370      D  9 = 0.09
R10 =   2.051      D10  = 0.54      N  6 = 1.846660    ν  6 = 23.8
R11 = -30.428      D11  = 0.12      N  7 = 1.834000    ν  7 = 37.2
R12 =   2.987      D12  = Variable
R13 = Stop         D13  = 0.48
R14 =   5.055      D14  = 0.36      N  8 = 1.696797    ν  8 = 55.5
R15 =  -3.928      D15  = 0.11
R16 =   4.309*     D16  = 0.39      N  9 = 1.583126    ν  9 = 59.4
R17 =  -2.039      D17  = 0.11      N10 = 1.846660     ν10 = 23.8
R18 =  -7.340      D18  = Variable
R19 =  -2.587      D19  = 0.34      N11 = 1.805181     ν11 = 25.4
R20 =  -1.496      D20  = 0.12      N12 = 1.603112     ν12 = 60.6
R21 =   3.421      D21  = Variable
R22 =   3.280      D22  = 0.52      N13 = 1.583130     ν13 = 59.4
R23 =   2.031*     D23  = 0.04
R24 =  15.237      D24  = 0.45      N14 = 1.603112     ν14 = 60.6
R25 =  -2.694      D25  = 0.11      N15 = 1.846660     ν15 = 23.8
R26 =  10.880      D26  = 0.54
R27 = ∞            D27  = 0.54      N16 = 1.516330     ν16 = 64.2
R28 = ∞
```

| Variable | Focal Length | | |
|---|---|---|---|
| Separation | 1.00 | 5.10 | 9.63 |
| D 5 | 0.16 | 3.58 | 4.54 |
| D12 | 4.68 | 1.27 | 0.31 |
| D18 | 0.37 | 1.11 | 0.77 |
| D21 | 1.35 | 0.62 | 0.96 |

EM = 0.050

Aspheric Coefficients:

```
R16    k = -3.01997e - 01   B = -2.11670e - 04   C = -4.22193e - 04
       D =  0.00000e + 00
R23    k = -1.74744e + 00   B =  1.42518e - 02   C = -1.38840e - 03
       D = -1.11439e - 03
```

Numerical Example 2:
f = 1 – 9.63    Fno = 2.88 – 3.58    2ω = 61.8° – 7.1°

```
R  1 =   9.634      D  1 = 0.25      N  1 = 1.846660    ν  1 = 23.8
R  2 =   5.478      D  2 = 0.96      N  2 = 1.487490    ν  2 = 70.2
R  3 = -33.876      D  3 = 0.04
R  4 =   4.654      D  4 = 0.56      N  3 = 1.696797    ν  3 = 55.5
R  5 =  13.134      D  5 = Variable
R  6 =  10.939      D  6 = 0.14      N  4 = 1.882997    ν  4 = 40.8
R  7 =   1.267      D  7 = 0.64
R  8 =  -6.253      D  8 = 0.13      N  5 = 1.696797    ν  5 = 55.5
R  9 =  13.210      D  9 = 0.09
R10 =   2.009      D10  = 0.50      N  6 = 1.846660    ν  6 = 23.8
R11 = -14.000      D11  = 0.13      N  7 = 1.834000    ν  7 = 37.2
R12 =   2.797      D12  = Variable
R13 = Stop         D13  = 0.48
R14 =   5.174      D14  = 0.36      N  8 = 1.696797    ν  8 = 55.5
R15 =  -3.972      D15  = 0.13
R16 =   4.479      D16  = 0.39      N  9 = 1.583126    ν  9 = 59.4
R17 =  -1.974      D17  = 0.11      N10 = 1.846660     ν10 = 23.8
R18 =  -6.598      D18  = Variable
R19 =  -2.690*     D19  = 0.34      N11 = 1.761821     ν11 = 26.5
R20 =  -1.423      D20  = 0.13      N12 = 1.603112     ν12 = 60.6
R21 =   3.664      D21  = Variable
R22 =   4.531      D22  = 0.52      N13 = 1.583130     ν13 = 59.4
R23 =   2.178*     D23  = 0.04
R24 =   4.759      D24  = 0.45      N14 = 1.603112     ν14 = 60.6
R25 =  -2.921      D25  = 0.11      N15 = 1.846660     ν15 = 23.8
R26 =   7.722      D26  = 0.54
R27 = ∞            D27  = 0.54      N16 = 1.516330     ν16 = 64.2
R28 = ∞
```

| Variable | Focal Length | | |
|---|---|---|---|
| Separation | 1.00 | 5.11 | 9.63 |
| D 5 | 0.16 | 3.48 | 4.41 |
| D12 | 4.54 | 1.22 | 0.29 |
| D18 | 0.38 | 1.14 | 0.74 |
| D21 | 1.35 | 0.58 | 0.99 |

EM = 0.0618

Aspheric Coefficients:

```
R19    k =  1.21517e + 00   B =  4.91283e - 03   C =  8.74225e - 03
       D = -1.50659e - 02
R23    k = -1.13285e + 00   B =  1.05455e - 02   C = -1.72003e - 04
       D = -1.05950e - 03
```

Numerical Example 3:
f = 1 – 9.67    Fno = 2.88 – 3.58    2ω = 58.5° – 6.6°

```
R  1 =   9.207      D  1 = 0.24      N  1 = 1.846660    ν  1 = 23.8
R  2 =   5.733      D  2 = 0.87      N  2 = 1.496999    ν  2 = 81.5
R  3 = -44.677      D  3 = 0.03
R  4 =   4.736      D  4 = 0.52      N  3 = 1.696797    ν  3 = 55.5
R  5 =  10.801      D  5 = Variable
R  6 =   6.889      D  6 = 0.13      N  4 = 1.834807    ν  4 = 42.7
R  7 =   1.266      D  7 = 0.77
R  8 =  -3.755      D  8 = 0.11      N  5 = 1.696797    ν  5 = 55.5
R  9 = -45.524      D  9 = 0.07
R10 =   2.096      D10  = 0.48      N  6 = 1.846660    ν  6 = 23.8
R11 =  47.523      D11  = 0.10      N  7 = 1.834807    ν  7 = 42.7
R12 =   2.754      D12  = Variable
R13 = Stop         D13  = 0.31
R14 =   7.107      D14  = 0.29      N  8 = 1.696797    ν  8 = 55.5
R15 =  -4.725      D15  = 0.11
R16 =   6.416      D16  = 0.39      N  9 = 1.603112    ν  9 = 60.6
R17 =  -2.146      D17  = 0.08      N10 = 1.846660     ν10 = 23.8
R18 =  -6.123      D18  = Variable
R19 =  -2.655*     D19  = 0.28      N11 = 1.688931     ν11 = 31.1
R20 =  -1.418      D20  = 0.09      N12 = 1.516330     ν12 = 64.1
R21 =   5.761      D21  = Variable
R22 =   4.185      D22  = 0.40      N13 = 1.696797     ν13 = 55.5
R23 =  -4.557      D23  = 0.03
R24 =   2.353      D24  = 0.43      N14 = 1.487490     ν14 = 70.2
R25 =  -4.447      D25  = 0.09      N15 = 1.761821     ν15 = 26.5
R26 =   3.293      D26  = 0.11
R27 = -68.820      D27  = 0.24      N16 = 1.583126     ν16 = 59.4
R28 =  -6.503*     D28  = Variable
R29 = ∞            D29  = 0.41      N17 = 1.516330     ν17 = 64.2
R30 = ∞
```

| Variable | Focal Length | | |
|---|---|---|---|
| Separation | 1.00 | 5.21 | 9.67 |
| D 5 | 0.13 | 3.61 | 4.59 |
| D12 | 4.70 | 1.22 | 0.24 |
| D18 | 0.38 | 1.59 | 1.20 |
| D21 | 1.80 | 0.47 | 1.00 |
| D28 | 0.40 | 0.53 | 0.39 |

EM = 0.0613

Aspheric Coefficients:

```
R19    k = -1.98576e + 00   B = -1.66421e - 02   C =  4.09421e - 03
       D = -1.32089e - 02
R28    k = -1.35126e + 01   B =  1.25669e - 02   C =  2.71734e - 04
       D = -8.62700e - 04
```

Numerical Example 4:
f = 1 – 9.63    Fno = 2.88 – 3.25    2ω = 58.5° – 6.7°

```
R  1 =   8.842      D  1 = 0.24      N  1 = 1.846660    ν  1 = 23.8
R  2 =   5.523      D  2 = 0.87      N  2 = 1.496999    ν  2 = 81.5
R  3 = -69.186      D  3 = 0.03
R  4 =   4.752      D  4 = 0.52      N  3 = 1.696797    ν  3 = 55.5
R  5 =  11.378      D  5 = Variable
R  6 =   6.178      D  6 = 0.13      N  4 = 1.804000    ν  4 = 46.6
R  7 =   1.251      D  7 = 0.80
R  8 =  -3.897      D  8 = 0.11      N  5 = 1.696797    ν  5 = 55.5
R  9 = -57.209      D  9 = 0.07
R10 =   2.005      D10  = 0.48      N  6 = 1.846660    ν  6 = 23.8
R11 =  24.977      D11  = 0.10      N  7 = 1.834000    ν  7 = 37.2
R12 =   2.502      D12  = Variable
R13 = Stop         D13  = 0.31
R14 =   8.360      D14  = 0.29      N  8 = 1.696797    ν  8 = 55.5
R15 =  -5.179      D15  = 0.11
R16 =   5.216      D16  = 0.39      N  9 = 1.603112    ν  9 = 60.6
```

-continued

| | | | |
|---|---|---|---|
| R17 = −2.212 | D17 = 0.08 | N10 = 1.846660 | υ10 = 23.8 |
| R18 = −5.710 | D18 = Variable | | |
| R19 = −3.160* | D19 = 0.28 | N11 = 1.688931 | υ11 = 31.1 |
| R20 = −1.923 | D20 = 0.09 | N12 = 1.516330 | υ12 = 64.1 |
| R21 = 5.859 | D21 = Variable | | |
| R22 = 2.576 | D22 = 0.40 | N13 = 1.693500 | υ13 = 53.2 |
| R23 = 3.132* | D23 = 0.03 | | |
| R24 = 4.070 | D24 = 0.43 | N14 = 1.487490 | υ14 = 70.2 |
| R25 = −3.377 | D25 = 0.09 | N15 = 1.761821 | υ15 = 26.5 |
| R26 = 2.926 | D26 = 0.44 | | |
| R27 = ∞ | D27 = 0.41 | N16 = 1.516330 | υ16 = 64.2 |
| R28 = ∞ | | | |

| Variable Separation | Focal Length | | |
|---|---|---|---|
| | 1.00 | 5.16 | 9.63 |
| D 5 | 0.13 | 3.62 | 4.61 |
| D12 | 4.71 | 1.22 | 0.24 |
| D18 | 0.38 | 1.59 | 1.09 |
| D21 | 1.83 | 0.61 | 1.28 |

EM = 0.0635

Aspheric Coefficients:

R19  k = −2.65597e + 00  B = −1.37784e − 02  C = 1.40206e − 02
     D = −2.28026e − 02
R23  k = −3.69108e + 00  B = 1.20402e − 02   C = 1.06619e − 03
     D = −2.07806e − 03

Numerical Example 5:
f = 1 − 9.67   Fno = 2.88 − 3.25   2ω = 58.5° − 6.6°

| | | | |
|---|---|---|---|
| R 1 = 9.207 | D 1 = 0.24 | N 1 = 1.846660 | υ 1 = 23.8 |
| R 2 = 5.733 | D 2 = 0.87 | N 2 = 1.496999 | υ 2 = 81.5 |
| R 3 = −44.677 | D 3 = 0.03 | | |
| R 4 = 4.736 | D 4 = 0.52 | N 3 = 1.696797 | υ 3 = 55.5 |
| R 5 = 10.801 | D 5 = Variable | | |
| R 6 = 6.889 | D 6 = 0.13 | N 4 = 1.834807 | υ 4 = 42.7 |
| R 7 = 1.266 | D 7 = 0.77 | | |
| R 8 = −3.755 | D 8 = 0.11 | N 5 = 1.696797 | υ 5 = 55.5 |
| R 9 = −45.524 | D 9 = 0.07 | | |
| R10 = 2.096 | D10 = 0.48 | N 6 = 1.846660 | υ 6 = 23.8 |
| R11 = 47.523 | D11 = 0.10 | N 7 = 1.834807 | υ 7 = 42.7 |
| R12 = 2.754 | D12 = Variable | | |
| R13 = Stop | D13 = 0.31 | | |
| R14 = 7.107 | D14 = 0.29 | N 8 = 1.696797 | υ 8 = 55.5 |
| R15 = −4.725 | D15 = 0.11 | | |
| R16 = 6.416 | D16 = 0.39 | N 9 = 1.603112 | υ 9 = 60.6 |
| R17 = −2.146 | D17 = 0.08 | N10 = 1.846660 | υ10 = 23.8 |
| R18 = −6.123 | D18 = Variable | | |
| R19 = 2.655* | D19 = 0.28 | N11 = 1.688931 | υ11 = 31.1 |
| R20 = −1.418 | D20 = 0.09 | N12 = 1.516330 | υ12 = 64.1 |
| R21 = 5.761 | D21 = Variable | | |
| R22 = 4.185 | D22 = 0.40 | N13 = 1.696797 | υ13 = 55.5 |
| R23 = −4.557 | D23 = 0.03 | | |
| R24 = 2.353 | D24 = 0.43 | N14 = 1.487490 | υ14 = 70.2 |
| R25 = −4.447 | D25 = 0.09 | N15 = 1.761821 | υ15 = 26.5 |
| R26 = 3.293 | D26 = 0.11 | | |
| R27 = −68.820 | D27 = 0.24 | N16 = 1.583126 | υ16 = 59.4 |
| R28 = 6.503* | D28 = 0.40 | | |
| R29 = ∞ | D29 = 0.41 | N17 = 1.516330 | υ17 = 64.2 |
| R30 = ∞ | | | |

| Variable Separation | Focal Length | | |
|---|---|---|---|
| | 1.00 | 5.21 | 9.67 |
| D 5 | 0.13 | 3.61 | 4.59 |
| D12 | 4.70 | 1.22 | 0.24 |
| D18 | 0.38 | 1.59 | 1.20 |
| D21 | 1.80 | 0.47 | 1.00 |

EM = 0.0856

Aspheric Coefficients:

R19  k = −1.98576e + 00  B = −1.66421e− 02  C = 4.09421e − 03
     D = −1.32089e − 02

R28  k = −1.35126e + 01  B = 1.25669e − 02   C = 2.71734e − 04
     D = −8.62700e − 04

Numerical Example 6:
f = 1 − 9.63   Fno = 2.88 − 3.12   2ω = 59.2° − 6.7°

| | | | |
|---|---|---|---|
| R 1 = 9.577 | D 1 = 0.24 | N 1 = 1.846660 | υ 1 = 23.8 |
| R 2 = 5.824 | D 2 = 0.88 | N 2 = 1.496999 | υ 2 = 81.5 |
| R 3 = −40.229 | D 3 = 0.03 | | |
| R 4 = 5.091 | D 4 = 0.53 | N 3 = 1.696797 | υ 3 = 55.5 |
| R 5 = 13.913 | D 5 = Variable | | |
| R 6 = 12.196 | D 6 = 0.14 | N 4 = 1.834807 | υ 4 = 42.7 |
| R 7 = 1.351 | D 7 = 0.71 | | |
| R 8 = −4.483 | D 8 = 0.11 | N 5 = 1.696797 | υ 5 = 55.5 |
| R 9 = −45.304 | D 9 = 0.07 | | |
| R10 = 2.021 | D10 = 0.49 | N 6 = 1.846660 | υ 6 = 23.8 |
| R11 = 15.081 | D11 = 0.10 | N 7 = 1.834807 | υ 7 = 42.7 |
| R12 = 2.510 | D12 = Variable | | |
| R13 = Stop | D13 = 0.31 | | |
| R14 = 12.167 | D14 = 0.30 | N 8 = 1.696797 | υ 8 = 55.5 |
| R15 = −4.540 | D15 = 0.11 | | |
| R16 = 4.381* | D16 = 0.39 | N 9 = 1.603112 | υ 9 = 60.6 |
| R17 = −2.284 | D17 = 0.08 | N10 = 1.846660 | υ10 = 23.8 |
| R18 = −6.018 | D18 = Variable | | |
| R19 = −3.613 | D19 = 0.27 | N11 = 1.636360 | υ11 = 35.4 |
| R20 = −1.510 | D20 = 0.12 | N12 = 1.583126 | υ12 = 59.4 |
| R21 = 6.511* | D21 = Variable | | |
| R22 = 3.442 | D22 = 0.43 | N13 = 1.693500 | υ13 = 53.2 |
| R23 = −2.546* | D23 = 0.03 | | |
| R24 = 3.190 | D24 = 0.43 | N14 = 1.487490 | υ14 = 70.2 |
| R25 = −3.189 | D25 = 0.09 | N15 = 1.761821 | υ15 = 26.5 |
| R26 = 2.753 | D26 = 0.45 | | |
| R27 = ∞ | D27 = 0.41 | N16 = 1.516330 | υ16 = 64.2 |
| R28 = ∞ | | | |

| Variable Separation | Focal Length | | |
|---|---|---|---|
| | 1.00 | 5.21 | 9.63 |
| D 5 | 0.14 | 3.62 | 4.61 |
| D12 | 4.72 | 1.23 | 0.24 |
| D18 | 0.39 | 1.60 | 0.99 |
| D21 | 1.84 | 0.67 | 1.35 |

EM = 0.0973

Aspheric Coefficients:

R16  k = 1.89132e + 00   B = −2.44841e − 03  C = −1.13890e − 03
     D = 0.00000e + 00
R21  k = 3.90525e + 00   B = 2.32979e − 03   C = −2.75465e − 03
     D = 1.58455e − 03
R23  k = −4.28855e + 00  B = −2.27812e − 03  C = 2.85433e − 03
     D = −1.05790e − 03

*: Aspheric Surface

TABLE 1

| Con-dition | Numerical Example | | | | | |
|---|---|---|---|---|---|---|
| | 1 | 2 | 3 | 4 | 5 | 6 |
| (1) | 1.673 | 1.631 | 1.377 | 1.324 | 1.377 | 1.382 |
| (2) | 2.363 | 2.381 | 2.830 | 2.781 | 2.830 | 2.696 |
| (3) | 9.630 | 9.629 | 9.666 | 9.626 | 9.666 | 9.635 |
| (4) | 0.0087 | 0.0105 | 0.0122 | 0.0087 | 0.0122 | 0.0140 |
| (5) | 0.489 | 0.478 | 0.508 | 0.523 | 0.508 | 0.516 |
| (6) | ... | ... | 0.213 | 0.244 | 0.213 | 0.169 |
| (7) | 2.144 | 1.879 | 2.221 | 2.060 | 2.221 | 2.260 |

As has been described above, according to each of the first to third embodiments, a relatively-small-and-light lens unit that is a part of a variable magnification optical system is made to move in directions perpendicular to the optical axis to correct the shaking of an image caused by the vibration (tilt) of the variable magnification optical system. Accordingly, it is possible to attain a variable magnification optical system capable of suppressing the amount of decentering aberration occurring when the above lens unit is moved for decentering, thereby correcting decentering aberration well, while attaining a reduction in size of the whole apparatus, the simplification of a mechanism, and a decrease of the load on the driving means.

In particular, it is possible to realize a variable magnification optical system having an image stabilizing function, which has higher optical performance than that of a conventional photographic system for a video camera, while having such a large variable magnification ratio as 10 or more, and which is also adaptable for a photographic system for use with an electronic still camera using an image sensor having 1,000,000 pixels or more.

Figure 17A:
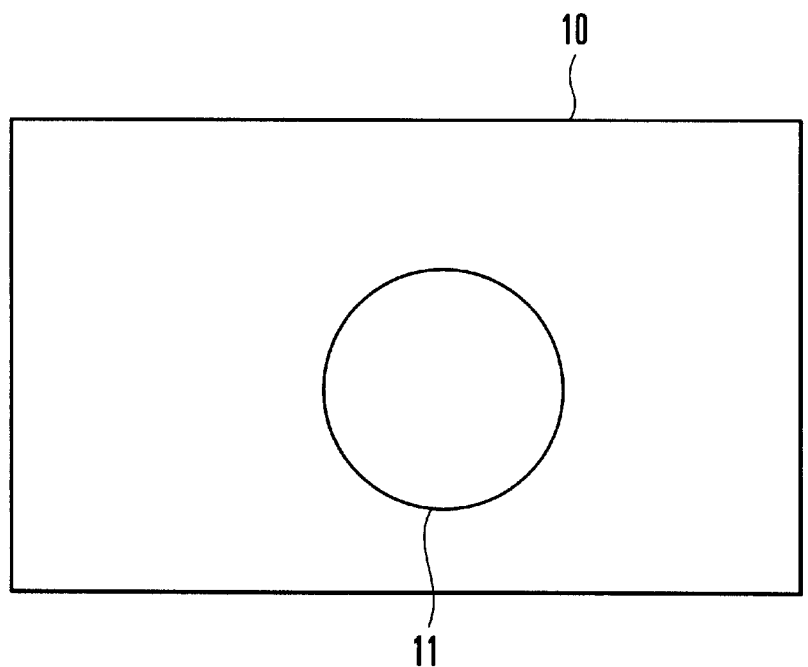
FIGS. 17A and 17B are outline diagrams showing the arrangement of an electronic still camera provided with a variable magnification optical system having an image stabilizing function according to the invention.
Figure 17B:
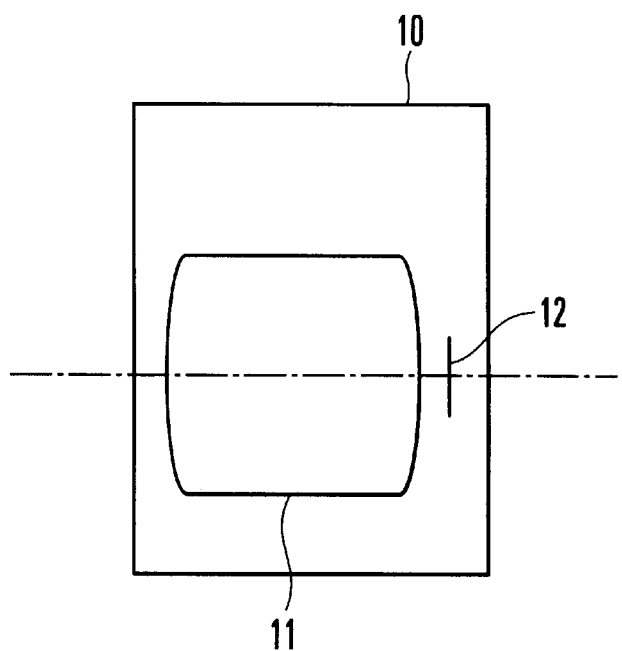

Next, an optical apparatus (electronic still camera) provided with a variable magnification optical system according to any one of the numerical examples 1 to 6 is described, as an embodiment of the invention, with reference to FIGS. 17A and 17B.

FIG. 17A and FIG. 17B are a front view and a side sectional view, respectively, showing in outline the electronic still camera. In FIGS. 17A and 17B, reference numeral 10 denotes an electronic still camera body (casing), reference numeral 11 denotes a photographic system using a variable magnification optical system according to any one of the numerical examples 1 to 6, and reference numeral 12 denotes an image sensor, such as a CCD.

The variable magnification optical system according to each of the numerical examples 1 to 6 is corrected well for aberration while securing a zoom ratio to a given degree or more, and is, therefore, adaptable for a photographic system for use with an electronic still camera using an image sensor having 1,000,000 pixels or more.

What is claimed is:

1. A variable magnification optical system, comprising, in order from an object side to an image side:

a first lens unit of positive optical power;

a second lens unit of negative optical power, said second lens unit moving along an optical axis during a variation of magnification;

a third lens unit of positive optical power;

a fourth lens unit of negative optical power, said fourth lens unit moving along the optical axis during the variation of magnification; and a fifth lens unit of positive optical power, wherein said third lens unit is moved in such a way as to have a component having directions perpendicular to the optical axis to displace an image formed by said variable magnification optical system.

2. A variable magnification optical system according to claim 1, wherein said variable magnification optical system satisfies the following condition:

$$0.3 < |(1-\beta 3)\cdot \beta 45| < 3$$

where $\beta 3$ is a magnification of said third lens unit at a telephoto end, and $\beta 45$ is a composite magnification of said fourth lens unit and said fifth lens unit at the telephoto end.

3. A variable magnification optical system according to claim 1, wherein said variable magnification optical system satisfies the following conditions:

$$1.6 < f3/fw < 4$$

$$4 < ft/fw < 23$$

where f3 is the focal length of said third lens unit, fw is the focal length at a wide-angle end of said variable magnification optical system, and ft is the focal length at a telephoto end of said variable magnification optical system.

4. A variable magnification optical system according to claim 1, wherein said variable magnification optical system satisfies the following condition:

$$1.7\times 10^{-3} < |(1-\beta 3)\cdot \beta 45|\cdot EM/ft < 0.05$$

where $\beta 3$ is a magnification of said third lens unit at a telephoto end, $\beta 45$ is a composite magnification of said fourth lens unit and said fifth lens unit at the telephoto end, EM is a maximum amount of movement of said third lens unit in directions perpendicular to the optical axis at the telephoto end, and ft is the focal length at the telephoto end of said variable magnification optical system.

5. A variable magnification optical system according to claim 1, wherein said variable magnification optical system satisfies the following condition:

$$0.3 < |f2/\sqrt{fw\cdot ft}| < 0.6$$

where f2 is the focal length of said second lens unit, fw is the focal length at a wide-angle end of said variable magnification optical system, and ft is the focal length at a telephoto end of said variable magnification optical system.

6. A variable magnification optical system according to claim 1, wherein said first lens unit remains stationary during the variation of magnification and during focusing.

7. A variable magnification optical system according to claim 1, wherein said fourth lens unit moves along the optical axis during focusing.

8. A variable magnification optical system according to claim 1, wherein said fifth lens unit remains stationary during the variation of magnification and during focusing.

9. A variable magnification optical system according to claim 1, wherein said fifth lens unit moves along the optical axis during the variation of magnification.

10. A variable magnification optical system according to claim 9, wherein said variable magnification optical system satisfies the following condition:

$$0.1 < M5/fw < 0.4$$

where M5 is a maximum amount of movement of said fifth lens unit L5 during the variation of magnification when focusing is performed on an infinitely distant object, and fw is the focal length at a wide-angle end of said variable magnification optical system.

11. A variable magnification optical system according to claim 10, wherein said variable magnification optical system satisfies the following condition:

$$4 < ft/fw < 23$$

where ft is the focal length at a telephoto end of said variable magnification optical system.

12. A variable magnification optical system according to claim 1, wherein said third lens unit includes at least one negative lens.

13. A variable magnification optical system according to claim 12, wherein said third lens unit consists of two positive lenses and one negative lens.

14. A variable magnification optical system according to claim 13, wherein said third lens unit consists of, in order from the object side to the image side, a positive lens, and a cemented lens composed of a positive lens and a negative meniscus lens having a strong concave surface facing the object side.

15. A variable magnification optical system according to claim 1, wherein said fourth lens unit consists of one positive lens and one negative lens.

16. A variable magnification optical system according to claim 1, wherein said second lens unit includes at least three negative lenses and at least one positive lens.

17. A variable magnification optical system according to claim 16, wherein said second lens unit consists of, in order from the object side to the image side, a negative meniscus lens having a strong concave surface facing the image side, a negative lens, a positive lens, and a negative lens.

18. A variable magnification optical system according to claim 17, wherein said variable magnification optical system satisfies the following condition:

$$1.4 < |f24/f2| < 4.6$$

where f24 is the focal length of said negative lens disposed on the most image side of said second lens unit, and f2 is the focal length of said second lens unit.

19. An optical apparatus, comprising:

a variable magnification optical system according to claim 1.

* * * * *

UNITED STATES PATENT AND TRADEMARK OFFICE
CERTIFICATE OF CORRECTION

PATENT NO. : 6,392,816 B1
DATED : May 21, 2002
INVENTOR(S) : Hiroyuki Hamano

It is certified that error appears in the above-identified patent and that said Letters Patent is hereby corrected as shown below:

Column 11,
Lines 19 and 58, "R28 = ∞" should read -- R28 = ∞
                                       *: Aspheric Surface --.

Column 12,
Line 35, "R30 = ∞" should read -- R30 = ∞
                                   *: Aspheric Surface --.

Column 13,
Line 12, "R28 = ∞" should read -- R28 = ∞
                                  *: Aspheric Surface --.
Line 53, "R30 = ∞" should read -- R30 = ∞
                                  *: Aspheric Surface --.

Column 14,
Line 30, "R28 = ∞" should read -- R28 = ∞
                                  *: Aspheric Surface --.
Line 47, "*: Aspheric Surface" should be deleted.

Signed and Sealed this

Twenty-eighth Day of January, 2003

JAMES E. ROGAN
*Director of the United States Patent and Trademark Office*